US006992952B2

(12) United States Patent
Endo et al.

(10) Patent No.: US 6,992,952 B2

(45) Date of Patent: Jan. 31, 2006

(54) WRIST WATCH CONTAINING INTERNAL TAG, RADIO WATCH, AND ANTENNA FOR WRIST WATCH

(75) Inventors: Takanori Endo, Saitama (JP); Seirou Yahata, Funabashi (JP); Takashi Tsuchida, Okegawa (JP)

(73) Assignee: Mitsubishi Materials Corporation, Tokyo (JP)

( * ) Notice: Subject to any disclaimer, the term of this patent is extended or adjusted under 35 U.S.C. 154(b) by 428 days.

(21) Appl. No.: 10/292,571

(22) Filed: Nov. 13, 2002

(65) Prior Publication Data

US 2004/0090868 A1 May 13, 2004

(51) Int. Cl.
*G04B 47/00* (2006.01)

(52) U.S. Cl. ........................................ 368/10; 368/278

(58) Field of Classification Search .................. 368/10, 368/47, 281, 276, 278, 88, 309, 223; 340/572.1, 340/573.1, 572.7; 343/718; 455/351

See application file for complete search history.

(56) References Cited

U.S. PATENT DOCUMENTS 5,172,348 A * 12/1992 Paratte ........................ 368/47
5,331,608 A * 7/1994 Umemoto et al. ............ 368/10
5,696,518 A * 12/1997 Itoh et al. ................... 343/718
5,798,984 A * 8/1998 Koch .......................... 368/10
5,946,610 A * 8/1999 Hama ......................... 455/351
6,278,873 B1 * 8/2001 Itakura et al. .............. 455/351
6,411,569 B1 * 6/2002 Megner et al. ............... 368/43
6,484,947 B1 * 11/2002 Miyata ....................... 235/492
2002/0044058 A1 * 4/2002 Heinrich et al. ......... 340/572.1
2003/0016122 A1 * 1/2003 Petrick .................... 340/10.41
2003/0058110 A1 * 3/2003 Rich ....................... 340/573.1

FOREIGN PATENT DOCUMENTS

EP 382130 A2 * 8/1990
EP 0 960 995 12/1999
JP 2000-105285 4/2000
JP 2001006007 A * 1/2001

OTHER PUBLICATIONS

Patent Abstracts of Japan, JP-2001-208875, Aug. 3, 2001.
Patent Abstracts of Japan, JP-2001-264463, Sep. 26, 2001.

* cited by examiner

*Primary Examiner*—Randy Gibson
*Assistant Examiner*—Jeanne-Marguerite Goodwin
(74) *Attorney, Agent, or Firm*—Oblon, Spivak, McClelland, Maier & Neustadt, P.C.

(57) ABSTRACT

The wrist watch with internal tag according to the present invention includes a watch case 12 which includes a ring shaped case 12*a* and a rear lid 12*c*, a drive section 13 which is housed in the watch case, a display section 14 which is housed in the watch case 12, is driven by the drive section 13, and displays a time instant, and an RFID tag (18) which is housed in the watch case 12 and includes an antenna 16 and an IC chip 17. The antenna includes a rod shaped magnetic core member 16*a* which is provided to follow around the inner surface of the rear lid 12*c* between the ring shaped case 12*a* and the drive section 13, and a coil 16*b* which is wound in a helical shape around the magnetic core member 16*a*. And the magnetic core member 16*a* is shaped so as to bend around following the inner surface of the ring shaped case (12*a*), and is made from a layered amorphous foil material or a composite material so as to have a certain flexibility.

31 Claims, 20 Drawing Sheets

DISPLAY SECTION
429
426
428
428a
428g
POWER SOURCE CIRCUIT
INPUT SECTION
CPU
428e
MEMORY
428f
MODULATION CIRCUIT
428c
DEMODULATION CIRCUIT
428d
WIRELESS FREQUENCY (RF) CIRCUIT
428b
SIGNAL TRANSMISSION AND RECEPTION ANTENNA
427
421
423b
422
ANTENNA
418
416
416f
MEMORY
416b
WIRELESS FREQUENCY (RF) CIRCUIT
416d
DEMODULATION CIRCUIT
MODULATION CIRCUIT
416c
CPU
416e
POWER SOURCE CIRCUIT
416a

WRIST WATCH CONTAINING INTERNAL TAG, RADIO WATCH, AND ANTENNA FOR WRIST WATCH

BACKGROUND OF THE INVENTION

1. Field of the Invention

The present invention relates to a wrist watch which contains an internal (electric) tag which is used for a RFID (Radio Frequency Identification) technique, to a radio watch of a wrist watch type which corrects the time instant by receiving a predetermined radio signal containing time instant information, and to an antenna which is used in these wrist watches.

2. Background Art

In the past, as a means for recognizing a person or object visually, a plate or the like has been provided bearing voter identification or a name or the like; but, with regard to the information which can be displayed upon such a plate, the scope thereof is extremely limited. Due to this, in recent years, an electric tag has been proposed which uses RFID (Radio Frequency Identification) technology and which is endowed with an electronic identification function. This tag for identification comprises an IC chip and an antenna which is electrically connected to this IC chip, and, if this tag for identification is attached to the above described plate, in addition to being able to validate information which is printed upon the surface of the plate, it is also possible to store various types of information in the above described IC chip. For example, it is possible to fit the above described plate with an attached tag to a person or to an object, and automatically to read out the information which has been stored in the IC chip, so as thereby to perform exit and entrance control for the person or object, or to perform stock management.

In recent years, this type of tag for identification is used as an identification device for controlling entrance through a gate which leads to a lift embarkment area for a ski area or to some type of recreational facility, or as a ticket or a season pass for a train or bus system. If the tag is used as identification for passing through this type of ski lift gate or for embarking in a transport device such as a train or a bus, the passenger who wishes to use the lift or the client who wishes to utilize the recreational facility, and particularly the passenger who wishes to embark in the transport device, is able to confirm that he is the proper person who is authorized to use this identification tag, simply by the operation of approaching the tag close to an identification means which is provided at the gate.

On the other hand, the person who wishes to use the ski lift or the recreational facility, or the passenger who wishes to ride in the transport device, normally wears upon his wrist a wrist watch which displays the time. Due to this, attempts have been made to include a tag for identification in such a wrist watch. If a tag for identification is housed in a wrist watch, it is not necessary for the person concerned to carry the tag for identification and the wrist watch separately and independently, and it is expected that this field of application will become more widespread than in the past, since the user can put the tag for identification on to his wrist without any sense that it does not belong there.

A per se conventional wrist watch, as shown in FIG. 32, comprises: a watch case 2 which comprises a ring shaped case 2*a*, a glass lid 2*b* which seals the front side of this ring shaped case 2*a*, and a rear lid 2*c* which seals the rear side of the ring shaped case 2*a*; a drive section 3 which is housed in this watch case 2; and a display section 4 which is housed in the watch case 2 and is driven by the drive section 3 to display the current instant of time. This wrist watch 1 is manufactured by first sealing the front side of the ring shaped case 2*a* by the glass lid 2*b*, then housing the display section 4 and the drive section 3 in that order within the interior of the ring shaped case 2*a*, and finally sealing the rear side of the ring shaped case 2*a* by affixing the rear lid 2*c*. Accordingly, when housing a tag for identification in a prior art type wrist watch 1, this is performed by winding the coil which is to be the antenna for the RFID tag so as to surround the periphery of the drive section 3 where there is a comparatively great amount of vacant space for clearance, in other words, so as to follow around the inner surface of the ring shaped case 2*a* and surround the drive section 3. An antenna which consists of a coil like this has an axis of magnetization which is perpendicular with respect to the face plate, so that it can be anticipated that, due to the axis of magnetization being perpendicular to the face plate which has the greatest surface area, the sensitivity of the RFID tag when using the wrist watch as an identification device will be enhanced, which will imply that the distance from an identification means at which it can be operated will be great.

However, in order for a conventional wrist watch to be durable and to project a feeling of high quality, the ring shaped case which constitutes its watch case is typically made from metal, which has a high electrical conductivity. Due to this, when such an antenna which consists of a coil wound to follow the inner surface of the case member is housed in this wrist watch, and when this antenna is receiving radio waves, induced electrical currents flow in the case member as well, and the problem arises that these induced currents tend to cancel out the radio waves from the outside. Furthermore as well, when electrical currents flow through the coil which constitutes the antenna, the problem arises that the sensitivity of the antenna can be deteriorated to a remarkable extent due to the flow of electrical currents in the metallic case member, and the consequence is that the distance from an identification means at which the RFID tag can be operated is remarkably shortened. In order to resolve this problem, it has been considered to form the case member of the watch case of the wrist watch from a non electrically conductive resin, but, if the case member is thus formed of resin, it is not possible for the wrist watch to project a really high quality feeling, and also there is the problem that its durability is deteriorated.

An objective of the present invention is to provide a wrist watch with an internal tag, which can house an RFID tag while maintaining the sensitivity of that tag comparatively high, and moreover without sacrificing the durability of the watch or the high quality feeling which it projects.

On the other hand, there is a per se conventional type of radio watch in which, as shown in FIG. 34, a rod shaped antenna 6 is provided on the external surface of a case 2 which is composed of a ring shaped case 2*a*, a glass lid 2*b*, and a rear lid 2*c* (see FIG. 33), with this antenna 6 being covered over by a cover 8 which is made of plastic or some other non magnetic material. With such a radio watch 1, the antenna 6 typically comprises a magnetic core member 6*a* which is made from a ferrite rod, and a coil 6*b* which is wound upon this magnetic core member 6*a*. Furthermore, two pairs of mounting arms 2*d*, 2*d* are fixed to the ring shaped case portion 2*a* so as to project therefrom on opposite sides thereof, and each of the ends of a wrist band 9 is pivotably fitted to one of these pairs of mounting arms 2*d*, 2*d*. By forming the antenna 6 of small diameter and short length, a compact size can be anticipated for the radio watch 1 constituted as described above. However, with the above described prior art type radio watch, there is the problem that there is a substantial deterioration of its external appearance, because the central line of the band 9 and the central axis of the circular case 2 do not coincide with each other.

Moreover, there is another type of wrist watch style radio watch which, as shown in FIG. 33, comprises a watch case 2, a drive section 3 which is housed in this watch case 2, a display section 4 which is housed in the watch case 2 and is driven by the drive section 3 to display the current instant of time, and a controller 7 which controls the drive section 3 based upon the detection output of an antenna 6 which is housed in the case 2. This wrist watch 1 is manufactured by first sealing the front side of a ring shaped case 2*a* by a glass lid 2*b*, then housing the display section 4 and the drive section 3 in that order within the interior of the ring shaped case 2*a*, and finally sealing the rear side of the ring shaped case 2*a* by affixing a rear lid 2*c*. Accordingly, in such a prior art type wrist watch 1, a comparatively great amount of vacant space is available for clearance around the periphery of the drive section 3, and, if the antenna 6 can be housed between the inner surface of the ring shaped case 2*a* and the drive section 3, it becomes possible to make the central line of the band 9 and the central axis of the case 2 to coincide with each other, and accordingly it can be anticipated that the beauty of the external appearance of this radio wrist watch 1 can be enhanced, because it can be made to have an external appearance which is similar to that of a conventional wrist watch.

However, in order for a conventional wrist watch to have durability and projects a high quality feeling, the ring shaped case and the rear lid which are incorporated in its watch case are made from metal, which has high electrical conductivity and is endowed with the characteristic of intercepting radio waves. Due to this, if the antenna is simply just housed in the space between the inner surface of the ring shaped case and the drive section, the problem arises that, since the ring shaped case and the rear lid constitute a barrier to the passage of radio waves, accordingly the antenna cannot receive the radio signals of the specific frequency (40 kHz) containing time instant information.

Furthermore, even if the radio waves are able to pass through the ring shaped case and the rear lid, if an antenna is used which has a coil which is wound so as to surround the drive section and follow around the inner surface of the ring shaped case so that its axis of magnetization is perpendicular to the face plate of the watch, when the antenna is receiving radio waves, induced electrical currents flow in the ring shaped case and in the periphery of the rear lid, so that the problem arises of serious deterioration in the sensitivity of the antenna. In order to avoid this problem, it has been considered to form the ring shaped case and the rear lid of the watch case of the wrist watch from a non electrically conductive resin, but, if the ring shaped case and the rear lid are thus formed from resin, the wrist watch cannot project a really high quality feeling, and also the problem arises that its durability is deteriorated.

Another objective of the present invention is to provide a radio watch which, while not losing any of its high quality feeling or beauty of external appearance, contains an antenna which is capable of accurately receiving a radio signal containing time instant information.

Furthermore, with such a watch, it has been considered to house both an antenna for receiving prescribed radio signals which contain time instant information and also an antenna which constitutes an identification tag, between the inner surface of the ring shaped case 2*a* and the drive section 3, both said antennas being provided separately and independently. However, with a prior art type watch, this necessitates enlargement of the space between the inner surface of the ring shaped case 2*a* and the drive section 3, and as a result there is the inconvenience that the outer diameter of the wrist watch as a whole is increased. Furthermore, housing these two antennas in the watch case means that it becomes necessary to set up these two antennas separately, and the problem arises that the unit cost of the wrist watch is increased because of the number of manufacturing operations for housing these two antennas in the watch case. In addition, when thus housing the two separate antennas, if these antennas have magnetic core members, the magnetic flux bundle due to one antenna exerts a reaction upon the other antenna, and the problem arises that both of these antennas may not receive their appropriate radio signals properly.

Furthermore, there are some types of conventional wrist watch in which only the ring shaped case is made from metal, with the rear lid being made from a plastic. With such a wrist watch, even though the radio waves can pass through the rear lid because it is made from plastic, nevertheless, induced electrical currents still flow in the ring shaped case when the antenna is receiving radio waves, and these induced currents tend to cancel out the radio waves from the outside, which remarkably deteriorates the sensitivity of the antenna. In order to resolve this problem, it has been considered to form the ring shaped case of the watch case of the wrist watch from a non electrically conductive resin as well, but, if both the ring shaped case and also the rear lid of the wrist watch are formed from a resin, it becomes a wrist watch of the same general level as a comparatively low cost wrist watch of the toy type, and it is impossible for it to project the really high quality feeling of a conventional wrist watch.

Another objective of the present invention is to provide an antenna for use in a wrist watch, which can receive both a radio signal for reading out information which is stored in an IC chip, and also a radio signal which contains time instant information. A further objective of the present invention is to provide a wrist watch which, while not losing any of its high quality feeling or beauty of external appearance, contains an antenna which can reliably receive a radio signal which contains time instant information and also a radio signal for reading out information which is stored in an IC chip.

SUMMARY OF THE INVENTION

The wrist watch with internal tag according to a first aspect of the present invention includes a watch case comprising a ring shaped case, a glass lid which seals a front side of the ring shaped case, and a rear lid which seals a rear side of the ring shaped case; a drive section which is housed in the watch case; a display section which is housed in the watch case, is driven by the drive section, and displays a time instant; and an RFID tag which is housed in the watch case and includes an antenna and an IC chip. The antenna includes a rod shaped magnetic core member which is provided between the ring shaped case and the drive section and follows around the inner surface of the rear lid, and the coil is wound in a helical shape around the magnetic core member.

With this wrist watch with internal tag, since the magnetic core member of the antenna is provided to lie along the inner surface of the rear lid between the ring shaped case and the drive section, accordingly the axis of magnetization of the antenna is parallel with the rear lid, so that, even if the ring shaped case is formed from metal, no induced electrical currents flow in this ring shaped case, and accordingly it is possible to avoid deterioration of the sensitivity of the antenna caused by such flow of induced electrical currents.

The magnetic core member may desirably be shaped so as to bend around following the inner surface of the ring shaped case. In this case, since the magnetic core member has a shape which is appropriate for the vacant space between the ring shaped case and the drive section, accordingly this empty space can efficiently be taken advantage of.

The magnetic core member may desirably be made from a layered amorphous foil material so as to have a certain flexibility. In this case, it is possible to obtain an antenna which operates efficiently in a comparatively low frequency band. Furthermore, by endowing the magnetic core member with flexibility, it becomes possible to deform the magnetic core member appropriately to the shape of the vacant space between the ring shaped case and the drive section, so that it is possible efficiently to take advantage of this empty space.

The magnetic core member may desirably be made from a composite material which is a mixture of powder or flakes of a soft magnetic ferrite or a soft magnetic metal with plastic or rubber. In this case, it is possible to obtain an antenna which operates efficiently in a comparatively high frequency band. Furthermore, by utilizing this composite material, at a comparatively high frequency, the mechanical strength is enhanced by comparison with a magnetic core member which is made from a sintered compact ferrite as known from the prior art.

The composite material may desirably contain a volume percentage of from 10% to 70% of the powder or the flakes of the soft magnetic ferrite or the soft magnetic metal, and is flexible. In this case, it becomes possible to endow the magnetic core member which is made from this composite material with appropriate flexibility, and, by deforming the magnetic core member appropriately to the shape of the vacant space between the ring shaped case and the drive section, it becomes possible efficiently to take advantage of this empty space.

The magnetic core member may desirably be formed by injection molding or compression forming the composite material. In this case, it becomes possible to form the shape of the magnetic core member which is made from the composite material appropriately to the shape of the vacant space between the ring shaped case and the drive section, so that it becomes possible even more efficiently to take advantage of this empty space.

The wrist watch with internal tag according to a second aspect of the present invention includes a watch case including a ring shaped case, a glass lid which seals a front side of the ring shaped case, and a rear lid which seals a rear side of the ring shaped case; a drive section which is housed in the watch case; a display section which is housed in the watch case, is driven by the drive section, and displays a time instant; and an RFID tag which is housed in the watch case and includes an antenna and an IC chip; wherein the antenna includes a magnetic backing which is provided to follow around the inner surface of the rear lid, a pair of magnetic core members which are provided to project from the magnetic backing on opposite sides of the drive section, and a series coil which is wound in a helical shape upon the pair of magnetic core members.

With this wrist watch with internal tag, the magnetic flux bundle in the antenna describes a loop by entering into one of the magnetic core members, passing through the magnetic backing, and emerging from the other magnetic core member. Due to this, the direction of the electrical currents which flow in the vicinity of the ring shaped case in the linked coils which are wound upon the pair of magnetic core members are mutually opposite, and the induced electrical current which is generated by the coil on one of the magnetic core members tends to cancel out the induced electrical current which is generated by the coil on the other of the magnetic core members, so that in actual fact no substantial induced electrical currents flow in the ring shaped case. Furthermore, since the magnetic backing is provided to follow along the inner surface of the rear lid, accordingly the axis of magnetization of this magnetic backing lies parallel to the rear lid, and, even if for example this rear lid is formed from a metallic material, no eddy currents flow in this rear lid. Accordingly, it is possible to avoid deterioration of the sensitivity of the antenna caused by the flow of induced electrical currents and of eddy currents.

The magnetic backing may desirably be formed so as to be capable of being inserted between the ring shaped case and the drive section. In this case, even if there is no gap available between the drive section and the rear lid, it is possible to house the RFID tag in the watch case by efficiently taking advantage of the vacant space between the ring shaped case and the drive section, by obtaining a magnetic backing which is appropriately shaped to conform to the shape of this vacant space between the ring shaped case and the drive section.

The magnetic backing may desirably be between the ring shaped case and the drive section and may be formed in a circular arc shape following along the inner surface of the ring shaped case. In this case, even if there is no gap available between the drive section and the rear lid, and even if moreover no fully ring shaped vacant space is present between the ring shaped case and the drive section, provided that at least a vacant space of a circular arc shape is present between the ring shaped case and the drive section, it is possible to obtain a magnetic backing which is appropriately shaped to conform to the shape of this circular arc shaped vacant space. Accordingly, it is possible to house the RFID tag in the watch case by efficiently taking advantage of this circular arc shaped vacant space between the ring shaped case and the drive section.

Any one, each, or all of the magnetic backing and the pair of magnetic core members may desirably be made from a composite material which is a mixture of powder or flakes of a soft magnetic ferrite or a soft magnetic metal with plastic or rubber. In this case, by utilizing this composite material, at a comparatively high frequency, an antenna is obtained whose mechanical strength is enhanced by comparison with that of a magnetic core member which is made from a sintered compact ferrite as known from the prior art.

The composite material may desirably contain a volume percentage of from 10% to 70% of the powder or the flakes of the soft magnetic ferrite or the soft magnetic metal, and is flexible. In this case, it becomes possible to endow the magnetic backing and the pair of magnetic core members which are made from this composite material with appropriate flexibility, and, by deforming the magnetic backing and the pair of magnetic core members appropriately to the shape of the vacant space between the ring shaped case and the drive section, it becomes possible efficiently to take advantage of this empty space.

All of the magnetic backing and the pair of magnetic core members may desirably be formed integrally by injection molding or compression forming the composite material. In this case, it becomes possible to form the shape of the magnetic backing and the pair of magnetic core members which are made from the composite material appropriately to the shape of the vacant space between the ring shaped case and the drive section, so that it becomes possible even more efficiently to take advantage of this empty space.

The radio watch according to a third aspect of the present invention includes a watch case including a ring shaped case, a glass lid which seals a front side of the ring shaped case, and a rear lid which seals a rear side of the ring shaped case; a drive section which is housed in the watch case; a display section which is housed in the watch case, is driven by the drive section, and displays a time instant; an antenna which receives a radio signal which includes time instant information; and a controller which is housed in the case and controls the drive section based upon the detected output of the antenna; wherein the antenna is provided between the ring shaped case and the drive section and follows around the inner surface of the ring shaped case; and the ring shaped case is formed from a metallic material, and the ring shaped case includes a first slit which is formed so as to cut through the ring shaped case in at least one place.

With this radio watch, since the ring shaped case which constitutes the outer surface of the wrist watch is formed from a metallic material, accordingly it is possible for the wrist watch to project a really high quality feeling. Furthermore, since the first slit is formed in the ring shaped case, accordingly it is possible to prevent the flow of induced electrical currents in this ring shaped case when the antenna receives the standard radio signal, so that the problem of cancellation of the radio waves by the induced electrical currents is avoided and the consequent deterioration of the sensitivity of the antenna is prevented.

A non electrically conductive resin may desirably be filled into the first slit, and may mutually adhere together opposing sides which define the first slit. In this case since, although the first slit is cut through the ring shaped case, the opposing sides which define this first slit are mutually adhered together by the non electrically conductive resin, accordingly dust, dirt, or drops of moisture or the like are prevented from getting into the watch, and furthermore it is possible to prevent any loss of strength of the ring shaped case due to the formation of the slit. Due to this, it is possible to ensure the durability of the watch case which incorporates this ring shaped case.

The opposing sides which define the first slit may desirably be made up of a plurality of linked sectional planes. In this case, by forming the slit from a plurality of linked sectional planes, the adhesion force by which the non electrically conductive resin is filled into this slit is increased, and it is possible further to reinforce the strength of the ring shaped case.

Concave portions may desirably be formed on either or both of the front side and the rear side of the ring shaped case, the first slit may be formed in a position to confront the concave portions, and inlay members which are made from the same substance as the ring shaped case may be attached with non electrically conductive resin in the concave portions. In this case, no induced electrical currents flow in the case member, since the non electrically conductive resin is interposed between the inlay members and the concave portions. On the other hand, it is possible to cover over the slits with the inlay members by adhering into the concave portions the inlay members which are made from the same substance as the ring shaped case, and accordingly it is possible to hide the first slit itself, so that it is possible for the watch to project a high level feeling of beauty.

The rear lid may desirably be either a metallic main lid, or a combination of a non metallic main lid and a supplementary metallic lid adhered upon the outer surface of the non metallic main lid so as to cover the non metallic main lid; and in the metallic main lid or the supplementary metallic lid, one or two or more second slits may be formed, of which at least one end portion reaches the outer edge of the metallic main lid or the supplementary metallic lid. In this case by using, as the rear lid which constitutes a part of the exterior surface of the wrist watch, either the metallic main lid, or the combination of the non metallic main lid and the supplementary metal lid, it is possible for the wrist watch to project a really high quality feeling. On the other hand, by forming the second slits so that at least one of their end portions reaches the outer edge of the metallic main lid or the supplementary metallic lid, it is possible to prevent the flow of ring shaped induced electrical currents when receiving radio wave signals, and it is possible thereby to prevent the phenomenon of cancellation of the radio signals by such induced electrical currents, so that deterioration of the sensitivity of the antenna is prevented, and it is possible for the resonant circuit which is constituted by the antenna and the condenser to resonate reliably with the standard radio signals.

Two or more second slits may desirably be formed in a radiating arrangement from the center of the metallic main lid or the supplementary metallic lid. In this case, it is possible to form the slits to be of the same length, which makes it possible to enhance the external appearance of the wrist watch from the point of view of beauty.

A non electrically conductive resin may desirably be filled into the second slit or slits. In this case, it is possible to prevent dust, dirt, or drops of moisture or the like from getting into the watch, and furthermore it is possible to prevent any loss of strength of the ring shaped case due to the formation of the second slits, and it is possible to ensure the durability of the watch case which incorporates this ring shaped case.

The antenna may desirably include a magnetic core member which is formed so as to follow the inner surface of the ring shaped case and surround the drive section, and a coil which is wound around the outside of the magnetic core member. In this case, it is possible to enhance the sensitivity of the antenna, since the antenna includes the magnetic core member. Furthermore, since the coil is wound so as to follow around the inner surface of the ring shaped case and so as to surround the drive section, accordingly the axis of magnetization of the antenna comes to be perpendicular to the face plate of the wrist watch, and accordingly the radio wave signals which contain the time instant information pass vertically through the face plate to arrive at the antenna, so that it is possible for the resonant circuit which is constituted by the antenna and the condenser to resonate reliably with the standard radio signals.

The magnetic core member may desirably be formed in a bobbin shape having a coil winding case, from a composite material made from magnetic powder or flakes and plastic. In this case, it becomes easy to wind the coil onto the magnetic core member, because the magnetic core member is shaped as a bobbin.

The magnetic core member may desirably be formed by injection molding or compression forming the composite material. In this case, it becomes possible to obtain a magnetic core member of the desired shape, and a comparatively low cost antenna is obtained.

The magnetic core member may desirably be made by winding a magnetic coated film which is formed by slush drying (applying and drying) an ink or a paint containing powder or flakes made from a magnetic material into a ring shape. In this case, it is possible to manufacture a magnetic core member which has a thickness of, for example, 0.8 mm or less, which is difficult to do by injection molding, and, even in a case in which the gap between the inner surface of the ring shaped case and the outer peripheral surface of the drive section is small, it becomes possible to house the antenna made up from this magnetic core member in this gap.

The antenna according to a fourth aspect of the present invention, for a wrist watch which includes a ring shaped case, a glass lid which seals a front side of the ring shaped case, and a rear lid which seals a rear side of the ring shaped case, and a drive section which is housed in the watch case: is housed within the watch case, and includes a magnetic core member and a coil assembly; the magnetic core member has a hole in which the drive section can be inserted, and is formed in a ring shape which can be inserted between the drive section and the ring shaped case; and the coil assembly includes a first coil which is wound around the outer peripheral surface of the ring shaped magnetic core member so as to have a magnetic core axis which coincides with the central axis of the ring shaped magnetic core member, and a second coil which is wound in a helical shape upon the ring shaped magnetic core member so as to have the ring shaped magnetic core member as its magnetic core axis.

With this antenna for a wrist watch, since the first and the second coils are wound upon the single magnetic core member, accordingly the function of serving as an antenna for receiving the specified radio signals which include the time instant information, and the function of serving as the antenna which is included in the identification tag, are combined together. Accordingly, with the antenna according to the present invention in which these two functions are combined, it is possible to house it in a case for a wrist watch without any requirement for enlargement of the vacant space between the inner surface of the ring shaped case of the wrist watch and its drive section.

Furthermore, since the magnetic core axis of the first coil and the magnetic core axis of the second coil are mutually perpendicular to one another, accordingly it is possible to avoid any reaction from the magnetic flux bundle which is generated by one of these magnetic cores upon the magnetic flux bundle which is generated by the other thereof, and it becomes possible for the first coil and the second coil reliably to receive the respective radio signals for the reception of which they are intended.

The magnetic core member may desirably be formed by injection molding or compression forming a composite material which is a mixture of magnetic powder or flakes with plastic. In this case, by forming the composite member by injection molding or compression forming, it is possible to obtain a magnetic core member which has any desired shape, and an antenna of comparatively low cost is obtained.

The magnetic core member may desirably be made by winding a magnetic coated film which is formed by slush drying an ink or a paint containing powder or flakes made from a magnetic material into a ring shape. In this case, it is possible to manufacture a magnetic core member which has a thickness of, for example, 0.8 mm or less, which is difficult to do by injection molding, and, even in a case in which the gap between the inner surface of the ring shaped case and the outer peripheral surface of the drive section is small, it becomes possible to house the antenna made up from this magnetic core member in this gap.

The wrist watch according to a fifth aspect of the present invention includes a watch case including a ring shaped case and a rear lid both of which are formed from a non electrically conductive plastic material; a display section which is housed in the watch case and displays a time instant; a drive section which is housed in the watch case and is made so as to be able to drive the display section; an antenna according to any one of the above antenna specifications, housed in the watch case so as to follow around the inner surface of the ring shaped case of the watch case and surround the drive section; a controller which is housed in the case, is electrically connected to the first coil, and is made so as to be able to control the drive section based upon the detected output of the antenna; and an IC chip which is housed in the case, is electrically connected to the second coil, and is made so as to be able to store predetermined information.

With this wrist watch, it is possible for it to combine both the function of serving as a tag which utilizes the RFID technique, and the function of correcting the time instant by receiving the specified radio signals including the time instant information.

A supplementary metallic lid, in which one or two or more second slits are formed with at least one end portion thereof reaching to the outer edge of the supplementary metallic lid, may desirably be adhered upon the outer surface of the rear lid which is formed from the non electrically conductive plastic. In this case, the strength of the watch case is enhanced by the supplementary metallic lid partially reinforcing the watch case of which the ring shaped case and the rear lid are each formed from non electrically conductive plastic. On the other hand, by forming the one or two or more second slits in the supplementary metallic lid with at least one of their end portions reaching to the outer edge of the supplementary metallic lid, it is possible to prevent the flow of ring shaped induced electrical currents in the periphery of the supplementary metallic lid when receiving radio wave signals, and accordingly the phenomenon of cancellation of these radio signals by such induced electrical currents is prevented.

A wrist watch according to yet another aspect of the present invention includes a watch case including a ring shaped case which is formed from a metallic material and a rear lid which is formed from a non electrically conductive plastic material; a display section which is housed in the watch case and displays a time instant; a drive section which is housed in the watch case and is made so as to be able to drive the display section; an antenna according to any one of the above antenna specifications, housed in the watch case so as to follow around the inner surface of the ring shaped case of the watch case and surround the drive section; a controller which is housed in the case, is electrically connected to the first coil, and is made so as to be able to control the drive section based upon the detected output of the antenna; and an IC chip which is housed in the case, is electrically connected to the second coil, and is made so as to be able to store predetermined information; wherein a first slit is formed in the ring shaped case by cutting through the ring shaped case in at least one place.

With this wrist watch, since the ring shaped case which constitutes a portion of the outer surface of the wrist watch is formed from a metallic material, accordingly it is possible for the wrist watch to project a really high quality feeling. Furthermore, since the first slit is formed in the ring shaped case, accordingly it is possible to prevent the flow of induced electrical currents in the ring shaped case when the antenna is receiving radio wave signals, and the phenomenon of cancellation of the radio wave signals by such induced electrical currents is avoided, so that it is possible to prevent deterioration of the sensitivity of the antenna.

A supplementary metallic lid, in which one or two or more second slits are formed with at least one end portion thereof reaching to the outer edge of the supplementary metallic lid, may desirably be adhered upon the outer surface of the rear lid which is formed from the non electrically conductive plastic. In this case, although the rear lid itself is formed from a non electrically conductive plastic, the beautiful appearance of the wrist watch is enhanced by the supplementary metallic lid being adhered upon the outer surface of the rear lid. On the other hand, since the one or two or more second slits are formed in the supplementary metallic lid with at least one of their end portions reaching to the outer edge of the supplementary metallic lid, accordingly the flow of ring shaped induced electrical currents in the periphery of the supplementary metallic lid when receiving radio wave signals is prevented, and it becomes possible to avoid the phenomenon of cancellation of the radio wave signals by such induced electrical currents.

And, a wrist watch according to still yet another aspect of the present invention includes a watch case including a ring shaped case and a rear lid both of which are formed from a metallic material; a display section which is housed in the watch case and displays a time instant; a drive section which is housed in the watch case and is made so as to be able to drive the display section; an antenna according to any one of the above antenna specifications, housed in the watch case so as to follow around the inner surface of the ring shaped case of the watch case and surround the drive section; a controller which is housed in the case, is electrically connected to the first coil, and is made so as to be able to control the drive section based upon the detected output of the antenna; and an IC chip which is housed in the case, is electrically connected to the second coil, and is made so as to be able to store predetermined information; wherein a first slit is formed in the ring shaped case by cutting through the ring shaped case in at least one place; and one or two or more second slits are formed in the rear lid with at least one end portion thereof reaching to the outer edge of the rear lid.

With this wrist watch, since both the ring shaped case and also the rear lid which define the outer surface of the wrist watch are formed from a metallic material, accordingly it is possible for the wrist watch to project an even higher quality feeling. On the other hand, since the first slit and also the second slits are formed in the ring shaped case and in the rear lid, accordingly it is possible to prevent the flow of induced electrical currents in the peripheries of the ring shaped case and the rear lid in a ring shape when receiving radio wave signals, and thus it is possible to avoid the problem of cancellation of the radio waves by such induced electrical currents and to enhance the sensitivity of the antenna.

DESCRIPTION OF THE PREFERRED

EMBODIMENTS

In the following, the present invention will be described in terms of the preferred embodiments thereof, and with reference to the drawings.

Figure 1:
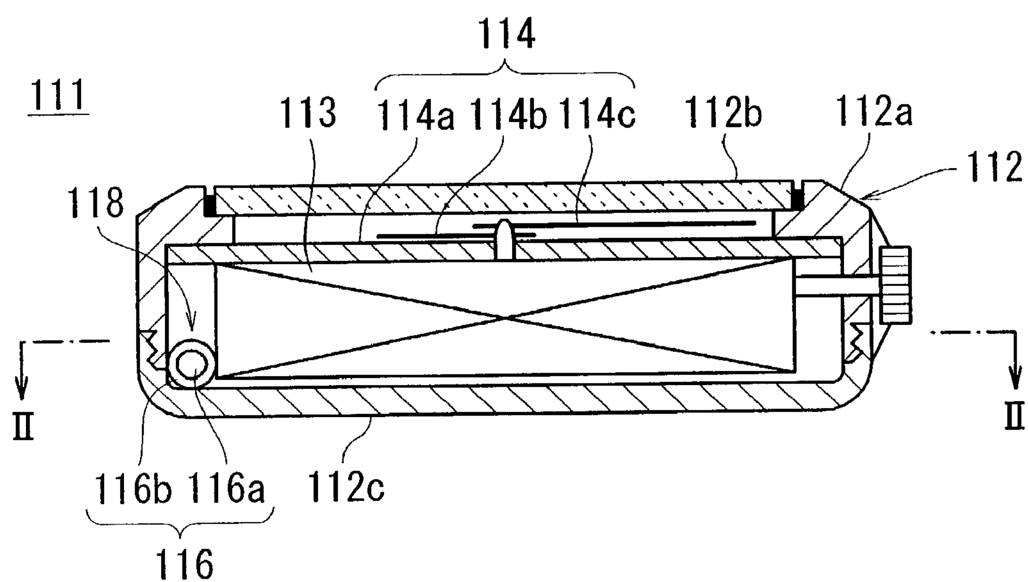
FIG. 1 is a sectional view showing a wrist watch containing a tag according to a preferred embodiment of the present invention.
Figure 2:
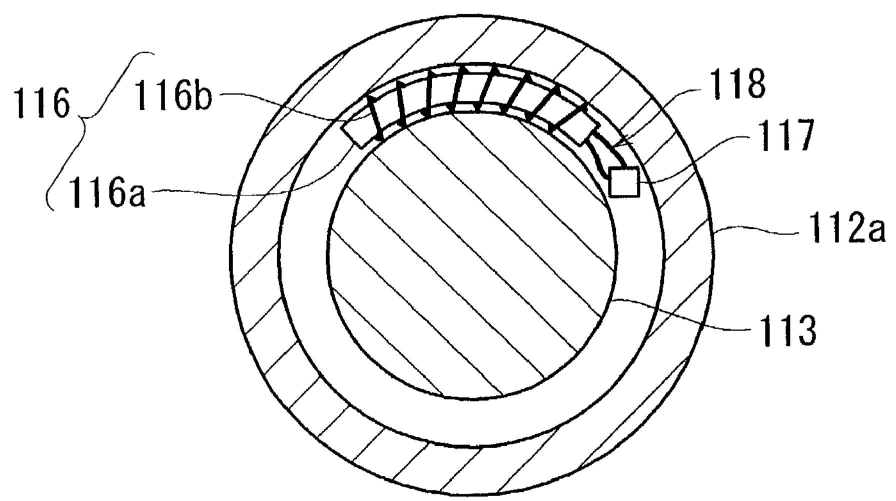
FIG. 2 is a sectional view taken in a plane shown by the arrows II—II in FIG. 1.
Figure 3:
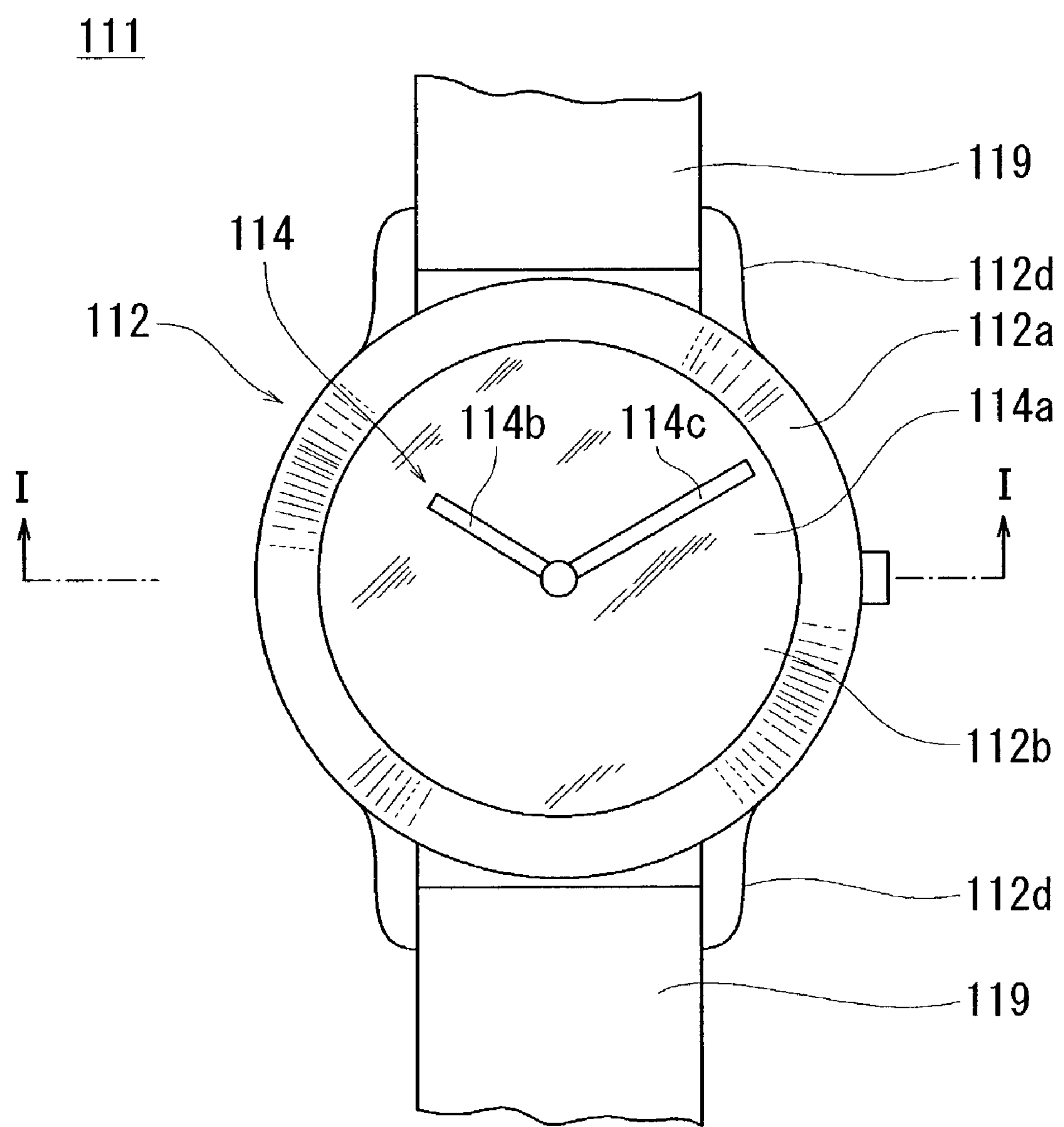
FIG. 3 is a plan view of this wrist watch.

As shown in FIG. 1 and FIG. 3, a wrist watch 111 comprises a watch case 112, a drive section 113 which is housed within the case 112, a display section 114 which is driven by the drive section 113 and displays a time instant, and an RFID tag 118 (shown in FIGS. 1 and 2) which comprises an antenna 116 and an IC chip 117. The case 112 comprises a ring shaped case 112*a*, a glass lid 112*b*, and a rear lid 112*c*. The ring shaped case 112*a* is formed in an annular shape and is made from metal; the glass lid 112*b* is formed in a circular plate shape and is made from an electrically insulating material (in this case, glass); and the rear lid 112*c* is formed in a circular plate shape and is made from an electrically insulating material such as plastic or the like. The display section comprises a face plate 114*a* for displaying characters, and a short hand 114*b*, a long hand 114*c* and a second hand not shown in the figures, which are driven by the drive section 113 and which rotate over the face plate 114*a*; and the current instant of time is displayed by the drive section 113 rotating this short hand 114*b*, long hand 114*c*, and second hand over the face plate 114*a*.

As shown in FIG. 1 and FIG. 2, the antenna 116 comprises a rod shaped magnetic core member 116*a* which is provided upon the inner surface of the rear lid 112 between the ring shaped case 112*a* and the drive section 113, and a coil 116*b* which is wound in a helical manner upon this magnetic core member 116*a*. In this preferred embodiment, the magnetic core member 116*a* is formed into a shape which bends around following the inner surface of the ring shaped case 112*a*. The magnetic core member 116*a* may be formed from a composite material which is made from a plastic and a powder or flakes of a metal or ferrite; or it may be formed from an amorphous foil having good flexibility such as an Fe type (such as METGLAS2605S-2 made by Allied Chemical) or a Co type (such as METGLAS2714A made by Allied Chemical) or the like which lies against and follows around the inner surface of the ring shaped case 112*a*, or from multiple superimposed layers of such an amorphous foil or foils, again lying against and following around the inner surface of the ring shaped case 112*a*.

The ferrite or metal in the above described composite material may be a soft magnetic ferrite or a soft magnetic metal, and, for the plastic, it is possible to use a thermoplastic plastic whose workability is good, or a thermosetting plastic whose heat resistance is good. Furthermore, for the above described metallic powder, an atomized powder or a reduced iron powder such as carbonyl iron powder or iron-permalloy or the like may be used. On the other hand, for the metallic flakes, it is possible to use flakes which are obtained by forming a powder by finely grinding the above described powder with a ball mill or the like, and then mechanically flattening this powder, or flakes which are obtained by colliding molten particles of an iron type or a cobalt type amorphous alloy with water cooled copper.

It is desirable to form the magnetic core member 116*a* which has been formed from composite material as a flexible member which can be provided to lie against and follow around the inner surface of the ring shaped case 112*a*. Due to this, it is desirable to use a composite material which contains ferrite or metallic powder or flakes in a range between 10% and 70% by volume. When the volume proportion of ferrite or metal powder or flakes is less than 10%, the permeability of the magnetic core member 116*a* which is obtained becomes low, and it is necessary to increase the size of the magnetic core member 116*a* itself in order to obtain the required permeability, so that it becomes impossible to plan for making the antenna 116 as a whole compact. On the other hand, when the volume proportion of ferrite or metal powder or flakes is greater than 70%, there is a danger that the magnetic core member 116*a* which is obtained has poor flexibility, and there is a possibility that problems may develop with deforming the magnetic core member 116*a* while fitting it into the ring shaped case 112*a* so as to lie along its inner surface. It should be understood that it is particularly desirable for the composite material to contain the ferrite or metallic powder or flakes in a range between 25% and 56% by volume.

When forming the magnetic core member 116*a* from the composite material, it is desirable to form the magnetic core member 116*a* by injection molding or by compression forming the composite material. However, if the required permeability is comparatively low, it is possible to form it by slush drying (applying and drying) the composite material upon a flexible film or sheet. In this case, although the magnetic core member 116*a* may be formed as a layered combination of this film or sheet and the composite material which has been slushed upon this film or sheet and dried, it would also be acceptable to strip off the painted on layer from the film or sheet, so that the magnetic core member 116*a* would be made as being only the slushed on and dried layer. By comparison with a magnetic core member which has been formed from a fragile ferrite material, the magnetic core member 116*a* formed in this manner is hard to break, even if it is made thin in order to be flexible. Furthermore, since the powder or flakes of ferrite or metal are dispersed in the plastic, in other words the magnetic powder or flakes are mutually insulated from one another by the plastic material, accordingly as a whole the magnetic core member 116*a* is not electrically conductive, so that excessive electrical current is not generated in it, even if it is subjected to high frequency radio waves.

The antenna 116 comprises the above described magnetic core member 116*a* and the coil 116*b* which is wound in a helical shape around this magnetic core member 116*a* as a core; in this preferred embodiment of the present invention, the coil 116*b* is made by winding coated copper wire. The RFID tag 118 is made by electrically connecting an IC chip 117 to the coil 116*b* of this antenna 116, and this tag 118 is housed within the watch case 112 around the periphery of the drive section 113. It should be understood that the reference symbols 112*d*, 112*d* in FIG. 3 denote two pairs of mounting arms which project from the ring shaped case 112*a* of the wrist watch, and between each pair of which one of the two ends of a wrist band 119 is pivotally mounted.

Figure 4:
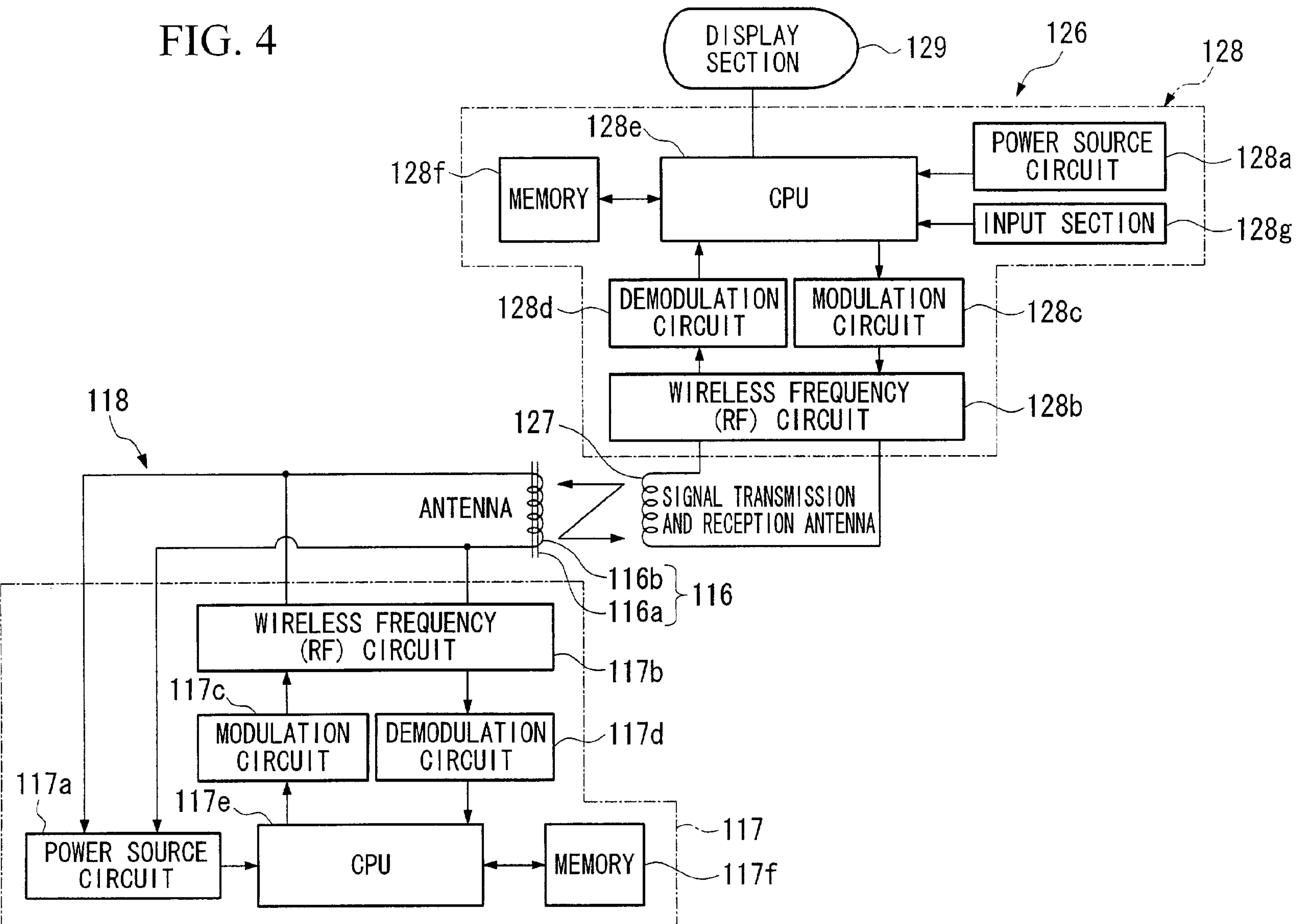
FIG. 4 is a block diagram showing the relationship between this RFID tag and an identification means.

As shown in FIG. 4, the IC chip 117 comprises a power source circuit 117*a*, a wireless frequency (RF) circuit 117*b*, a modulation circuit 117*c*, a demodulation circuit 117*d*, a CPU 117*e*, and a memory 117*f* which stores information related to the owner of the wristwatch to which this CPU 117*e* is connected. The power source circuit 117*a* houses a condenser (not shown in the figures), and this condenser forms a resonant circuit together with the antenna 116. When the antenna 116 receives a radio signal of a specified frequency (the frequency at which the above described resonant circuit resonates), this condenser is charged by electrical power which is generated by the action of their mutual induction. The power source circuit 117*a* rectifies and stabilizes this electrical power and supplies it to the CPU 117*e*, and activates the IC chip 117. The memory 117*f* comprises a ROM (read only memory), a RAM (random access memory), and an EEPROM (electrically erasable programmable read only memory), and, under the control of the CPU 117*e*, along with performing read out of stored data by radio data communication according to a read out command from an identification means 126 to be described hereinafter, also performs writing in of data according to a write in command from the identification means 126.

On the other hand, the identification means which reads out the information which is stored in the IC chip 117 comprises a signal transmission and reception antenna 127 which operates by mutual induction with the antenna 116, a processing section 128 which processes the radio signal which is received from the signal transmission and reception antenna 127, and a display section 129 which displays information which is stored in the IC chip 117. The signal transmission and reception antenna 127 is built so as to be capable of transmitting radio signals to the antenna 116 of the RFID tag 118 which is housed within the wristwatch 111, and to be capable of receiving radio signals from this antenna 116. Furthermore, the processing section 128 is connected to the signal transmission and reception antenna 127, and comprises a power source circuit 128*a* which includes a battery, a wireless frequency (RF) circuit 128*b*, a modulation circuit 128*c*, a demodulation circuit 128*d*, a CPU 128*e*, and a memory 128*f* which stores information which has been read out from the IC chip 117 to which this CPU 128*e* is connected. Furthermore, an input section 128*g* is connected to the CPU 128*e* of the processing section 128, and is built so as to be capable of writing in the information which has been inputted by this input section 128*g* into the IC chip 117.

The method of use of this wrist watch which contains an identification tag in this manner will now be explained.

First, before putting on the wrist watch 111, specific information related to the person who is putting on the wrist watch 111 is inputted from the input section 128*g* of the identification means 126, and this specific information related to the person who is putting on the wrist watch 111 is stored in the memory 117*f* of the IC chip 117. In this first preferred embodiment of the present invention, it is supposed that information related to a train season ticket is inputted, and in concrete terms that information related to the first date, the last date, and the track section over which riding in the train is permitted is stored in the memory 117*f*. After this information has been inputted, this wrist watch 111 is attached to the wrist of its owner by the belt 119, 119. In this case, with the wrist watch 111 incorporating a tag according to the present invention, when it has been put on the owner's wrist, since the ring shaped case 112*a* which appears at the periphery of the glass lid 112*b* is formed from a metallic material, it is possible for this wrist watch 111 to project a genuinely high quality feeling, and moreover the watch case 112 is able to ensure genuine durability.

On the other hand, an identification means 126 is provided at the boarding gate at the station, and, when the person who has put on the wrist watch 111 passes through the boarding gate, his wrist watch 111 gets near to the signal transmission and reception antenna 127 of the identification means 126 which is provided at this gate. The identification means 126 dispatches a query signal which has been converted from a binary digitized signal to the antenna 116 of the RFID tag 118 from the signal transmission and reception antenna 127 upon the specified radio frequency. Since the rear lid 112*c* of the wrist watch 111 is formed from a material which is electrically insulating, this rear lid 112*c* does not constitute a barrier to this radio signal which is to be received by the antenna 116 of the RFID tag 118 which is housed in the watch case 112, and accordingly the radio signal which has been dispatched from the signal transmission and reception antenna 127 passes through the glass lid 112*b* and the rear lid 112*c* and is received by the antenna 116. On the other hand, since the antenna 116 comprises the rod shaped magnetic core member 116*a* which is provided to lie along the inner surface of the rear lid 112 between the ring shaped case 112*a* and the drive section 113, and the coil 116*b* which is wound in a helical shape upon this magnetic core member 116*a*, accordingly the direction of its magnetic core is parallel to the plane of the rear lid 112*c*, so that no induced electrical current flows in the case member 112*a*, and due to the provision of the magnetic core member 116*a* the reception sensitivity of the antenna 116 itself is enhanced, and this antenna 116 effectively receives the radio signal which is generated from the signal transmission and reception antenna 127.

When the antenna 116 of the RFID tag 118 receives this radio signal, it charges the condenser of the power source circuit 117*a* with electrical power. The power source circuit 117*a* supplies electrical power to the CPU 117*e* and activates the IC chip 117, and, via the RF circuit 117*b*, causes the original digital version of the query signal to be reconstituted with the demodulation circuit 117*d*. Based upon this query signal, the CPU 117*e* dispatches the information related to this wrist watch 111 which is stored in the memory 111*f*. The transmission of this information is performed by modulating the data signal which has been binary converted by the modulation circuit 117*c* of the IC chip 117, then amplifying it by the RF circuit 117*b*, and then sending it from the antenna 116. The sent data signal is received by the signal transmission and reception antenna 127 of the identification means 126, and the processing section 128 displays the information from the RFID tag 118 specific to the person who is wearing the wrist watch 111 upon the display section 129, and also opens a door which is provided at the boarding gate so as to allow the person who is wearing the wrist watch 111 to board a train.

It should be understood that, although in the above description of this first preferred embodiment of the present invention the explanation described the watch case 112 as having a rear lid 112*c* formed in a circular plate shape from an electrically insulating material such a plastic or the like, as an alternative, it would also be acceptable to form this rear lid 112*c* from metal, provided that the antenna 116 having a magnetic core whose direction was parallel to the direction of the plane of the rear lid 112*c* was able to receive or transmit radio waves through, for example, a gap or the like present between the ring shaped case 112*a* and the rear lid 112*c* through which radio waves could pass.

Figure 5:
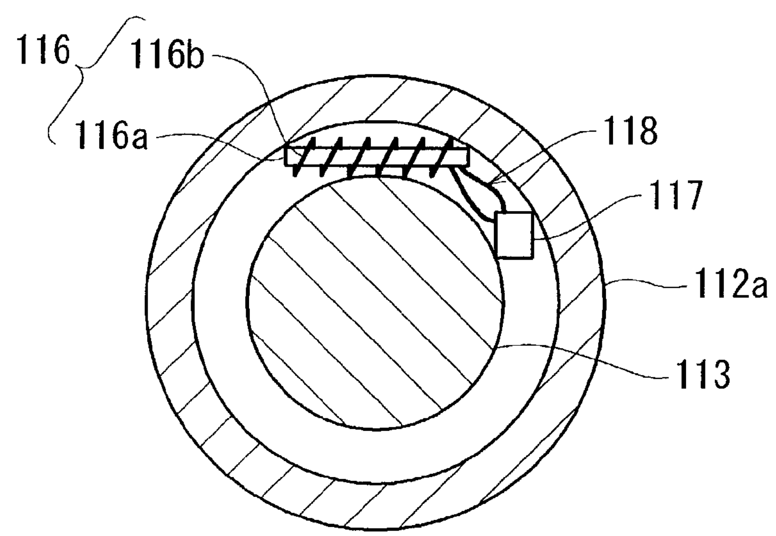
FIG. 5 is a sectional view showing another wrist watch containing a tag according to a preferred embodiment of the present invention.

Moreover, although in the above description of this first preferred embodiment the explanation described the magnetic core member 116*a* as being formed in a shape bent around following the inner surface of the ring shaped case 112*a*, it would also be acceptable for this magnetic core member 116*a* to be shaped as a straight rod, as shown in FIG. 5, provided that it was possible to house the antenna 116 within the vacant space between the ring shaped case 112*a* and the drive section 113.

Next, another preferred embodiment of the present invention will be explained with reference to the drawings.

Figure 6:
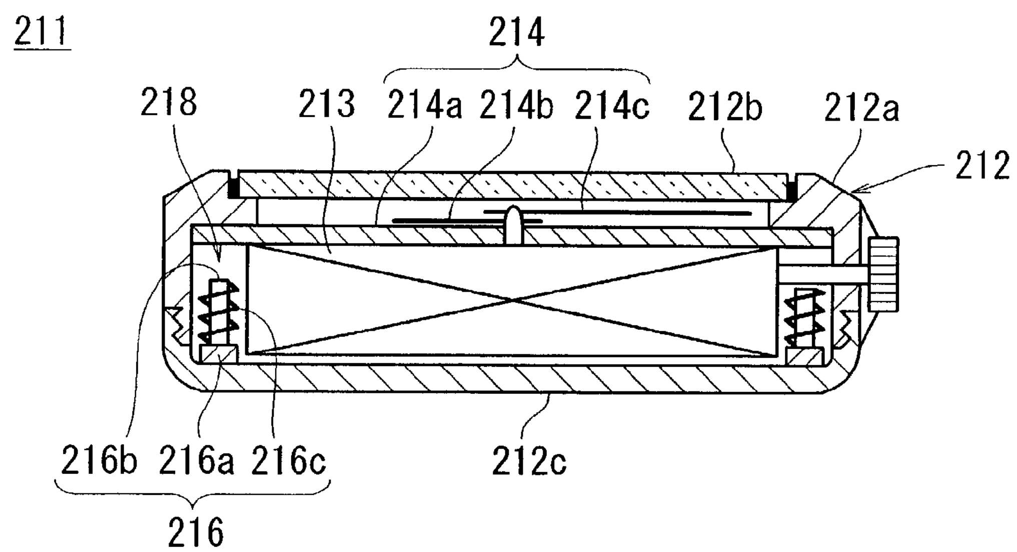
FIG. 6 is a sectional view showing yet another wrist watch containing a tag according to a preferred embodiment of the present invention.

As shown in FIG. 6 and FIG. 3 (regarding this embodiment, each of the referenece numbers in FIG. 3 and the explanation thereof should be read as the sum of the original reference number and a hundred), the wrist watch 211 according to this preferred embodiment also comprises a watch case 212, a drive section 213 which is housed within the case 212, a display section 214 which is driven by the drive section 213 and displays a time instant, and an RFID tag 218 (shown in FIGS. 6 and 7) which comprises an antenna 216 and an IC chip 217. The case 212 comprises a ring shaped case 212*a*, a glass lid 212*b*, and a rear lid 212*c*. The ring shaped case 212*a* is formed in an annular shape and is made from metal; the glass lid 212*b* is formed in a circular plate shape and is made from an electrically insulating material (in this case, glass); and the rear lid 212*c* is formed in a circular plate shape and is made from an electrically insulating material such as plastic or the like. And the display section 214 comprises a face plate 214*a* for displaying characters, and a short hand 214*b*, a long hand 214*c* and a second hand not shown in the figures, which are driven by the drive section 213 and which rotate over the face plate 214*a*; and the current instant of time is displayed by the drive section 213 rotating this short hand 214*b*, long hand 214*c*, and second hand over the face plate 214*a*.

Figure 7:
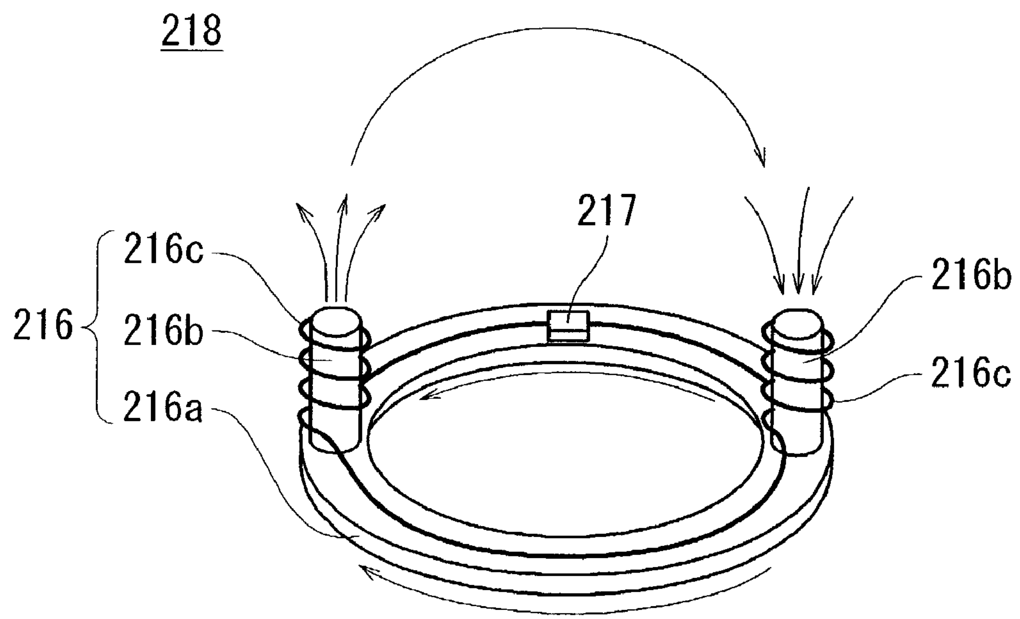
FIG. 7 is a perspective view showing this RFID tag.

As shown in FIG. 6 and FIG. 7, the antenna 216 comprises a magnetic backing 216*a* which is provided to follow around the inner surface of the rear lid 212*c* between the ring shaped case 212*a* and the drive section 213, a pair of pin shaped magnetic core members 216*b*, 216*b* which are provided to stand upon this magnetic backing 216*a*, and a pair of coils 216*c* which are wound in a helical manner upon these magnetic core members 216*b*, 216*b*. In this preferred embodiment, the magnetic backing 216*a* is formed into a ring shape which can be inserted between the ring shaped case 212*a* and the drive section 213, while the magnetic core members 216*b*, 216*b* are formed so as to project upwards from this magnetic backing 216*a* at opposite points thereof in a symmetrical manner. The magnetic backing 216*a* and the magnetic core members 216*b*, 216*b* may be formed from a composite material which is made from a plastic and a powder or flakes of a metal or ferrite; or they may be formed from an amorphous foil having good flexibility such as an Fe type (such as METGLAS2605S-2 made by Allied Chemical) or a Co type (such as METGLAS2714A made by Allied Chemical) or the like which can lie against and follow around the inner surface of the ring shaped case 212*a*, or from multiple superimposed layers of such an amorphous foil or foils, again lying against and following around the inner surface of the ring shaped case 212*a*.

The ferrite or metal in the above described composite material may be a soft magnetic ferrite or a soft magnetic metal, and, for the plastic, it is possible to use a thermoplastic plastic whose workability is good, or a thermosetting plastic whose heat resistance is good. Furthermore, for the above described metallic powder, an atomized powder or a reduced iron powder such as carbonyl iron powder or iron-permalloy or the like may be used. On the other hand, for the metallic flakes, it is possible to use flakes which are obtained by forming a powder by finely grinding the above described powder with a ball mill or the like, and then mechanically flattening this powder, or flakes which are obtained by colliding molten particles of an iron type or a cobalt type amorphous alloy with water cooled copper.

It is desirable to form the magnetic core backing 216*a* which has been formed from composite material as a flexible member which can be provided to lie against and follow around the inner surface of the ring shaped case 212*a*. Due to this, it is desirable to use a composite material which contains ferrite or metallic powder or flakes in a range between 10% and 70% by volume. When the volume proportion of ferrite or metal powder or flakes is less than 10%, the permeability of the magnetic core member 216*a* which is obtained becomes low, and it is necessary to increase the size of the magnetic backing 216*a* itself in order to obtain the required permeability, so that it becomes impossible to plan for making the antenna 216 as a whole compact. On the other hand, when the volume proportion of ferrite or metal powder or flakes is greater than 70%, there is a danger that the magnetic backing 216*a* which is obtained has poor flexibility, and there is a possibility that problems may develop with deforming this magnetic backing 216*a* while fitting it into the ring shaped case 212*a* so as to lie along its inner surface. It should be understood that it is particularly desirable for the composite material to contain the ferrite or metallic powder or flakes in a range between 25% and 56% by volume.

When forming the magnetic backing 216*a* and the magnetic core members 216*b*, 216*b* from the composite material, it is desirable to form them by injection molding or by compression forming the composite material. By comparison with a magnetic backing 216*a* and magnetic core members 216*b*, 216*b* which have been formed from a fragile ferrite material, the backing and the members formed in this manner are hard to break, even if they are made thin in order to be flexible. Furthermore, since the powder or flakes of ferrite or metal are dispersed in the plastic, in other words the magnetic powder or flakes are mutually insulated from one another by the plastic material, accordingly as a whole the magnetic backing 216*a* and the magnetic core members 216*b*, 216*b* are not electrically conductive, so that excessive electrical currents are not generated in them, even if they are subjected to high frequency radio waves.

The antenna 216 comprises the above described pair of coils 216*c* which are wound in helical shapes around these magnetic core members 216*b*, 216*b* as cores; in this preferred embodiment of the present invention, the coils 216*c* are made by winding coated copper wire. This coated copper wire is wound so that the magnetic flux bundles which are generated in the pair of magnetic core members 216*b*, 216*b* when electrical current is passed through the copper wire are connected via the magnetic backing 216*a*; and the RFID tag 218 is made by electrically connecting an IC chip 217 to the coils 216*c* which are obtained by winding this copper wire, with the IC chip 217 being carried upon the magnetic backing 216*a*. The tag 218 which is made in this manner is housed in the watch case 212 so that the pair of magnetic core members 216*b*, 216*b* are at the periphery of the drive section 213, and so that it has a central axis which is perpendicular to the glass lid in a position which sandwiches this drive section 213, and so that, in its state as housed in the watch case, the magnetic backing 216*a* is provided along the inner surface of the rear lid 212*c* between the ring shaped case 212*a* and the drive section 213. It should be understood that the reference symbols 212*d*, 212*d* in FIG. 3 denote two pairs of mounting arms which project from the ring shaped case 212*a* of the wrist watch, and between each pair of which one of the two ends of a wrist band 219 is pivotally mounted.

The IC chip 217, the identification means 226 and so on are the same in this preferred embodiment as the ones shown in FIG. 4 (regarding this embodiment, each of the referenece numbers in FIG. 4 and the explanation thereof should be read as the sum of the original reference number and a hundred) and described above with respect to the previous preferred embodiment, and accordingly the description thereof will be curtailed.

The method of use of this wrist watch which contains an identification tag in this manner will now be explained.

First, before putting on the wrist watch 211, specific information related to the person who is putting on the wrist watch 211 is inputted from the input section 228*g* of the identification means 226, and this specific information related to the person who is putting on the wrist watch 211 is stored in the memory 217*f* of the IC chip 217. In this preferred embodiment of the present invention, it is supposed that information related to a train season ticket is inputted, and in concrete terms that information related to the first date, the last date, and the track section over which riding in the train is permitted is stored in the memory 217*f*. After this information has been inputted, this wrist watch 211 is attached to the wrist of its owner by the belt 219, 219. In this case, with the wrist watch 211 incorporating a tag according to the present invention, when it has been put on the owner's wrist, since the ring shaped case 212*a* which appears at the periphery of the glass lid 212*b* is formed from a metallic material, it is possible for this wrist watch 211 to project a genuinely high quality feeling, and moreover it is possible to ensure genuine durability for the watch case 212.

On the other hand, an identification means 226 is provided at the boarding gate at the station, and, when the person who has put on the wrist watch 211 passes through the boarding gate, his wrist watch 211 gets near to the signal transmission and reception antenna 227 of the identification means 226 which is provided at this gate. The identification means 226 dispatches a query signal which has been converted from a binary digitized signal to the antenna 216 of the RFID tag 218 from the signal transmission and reception antenna 227 upon the specified radio frequency. The radio waves which are dispatched from the signal transmission and reception antenna 227 pass through the glass lid 212*b* and are received at the antenna 216. Since the coated copper wire which constitutes the coils 216*c* is wound so that the magnetic flux bundles which are generated by the pair of magnetic core members 216*b*, 216*b* when electric current flows through this coated copper wire connect together and reinforce one another via the magnetic backing 216*a*, accordingly the magnetic flux bundle in the antenna 216, as shown by the solid arrows in FIG. 7, enters from one of the magnetic core members 216*b*, passes through the magnetic backing 216*a*, and emerges from the other one of the magnetic core members 216*b*, so as to describe a loop.

Due to this, the directions of the electrical currents which flow in the connected coils 216*c* which are wound upon the pair of magnetic core members 216*b*, 216*b* are mutually opposite in the vicinity of the ring shaped case 212*a*, so that the induced electrical current which is generated by the coil 216*c* of one of the magnetic core members 216*b* tends to quench the induced electrical current which is generated by the coil 216*c* of the other of the magnetic core members 216*b*, and as a result no significant induced electrical current actually flows in the ring shaped case 212*a*. Furthermore, since the magnetic backing 216*a* is provided to follow along the inner surface of the rear lid 212*c*, accordingly the axis of magnetization of this magnetic backing 216*a* is parallel to the rear lid 212*c*, so that, even though for example the rear lid 212*c* may be formed of metal, no eddy current flows in this rear lid 212*c*, and it is possible to avoid reduction of the sensitivity of the antenna 16 caused by flowing of induced current and eddy current. Yet further, the signal reception sensitivity of the antenna 216 as a whole is enhanced by providing the magnetic core members 216*b*, 216*b*, and this antenna 216 can effectively receive the radio wave signals which emanate from the signal transmission and reception antenna 227.

When the antenna 216 of the RFID tag 218 receives this radio signal, it charges the condenser of the power source circuit 217*a* with electrical power. The power source circuit 217*a* supplies electrical power to the CPU 217*e* and activates the IC chip 217, and, via the RF circuit 217*b*, causes the original digital version of the query signal to be reconstituted with the demodulation circuit 217*d*. Based upon this query signal, the CPU 217*e* dispatches the information related to this wrist watch 211 which is stored in the memory 211*f*. The transmission of this information is performed by modulating the data signal which has been binary converted by the modulation circuit 217*c* of the IC chip 217, then amplifying it by the RF circuit 217*b*, and then sending it from the antenna 216. The sent data signal is received by the signal transmission and reception antenna 227 of the identification means 226, and the processing section 228 displays the information from the RFID tag 218 specific to the person who is wearing the wrist watch 211 upon the display section 229, and also opens a door which is provided at the boarding gate so as to allow the person who is wearing the wrist watch 211 to board a train.

Figure 8:
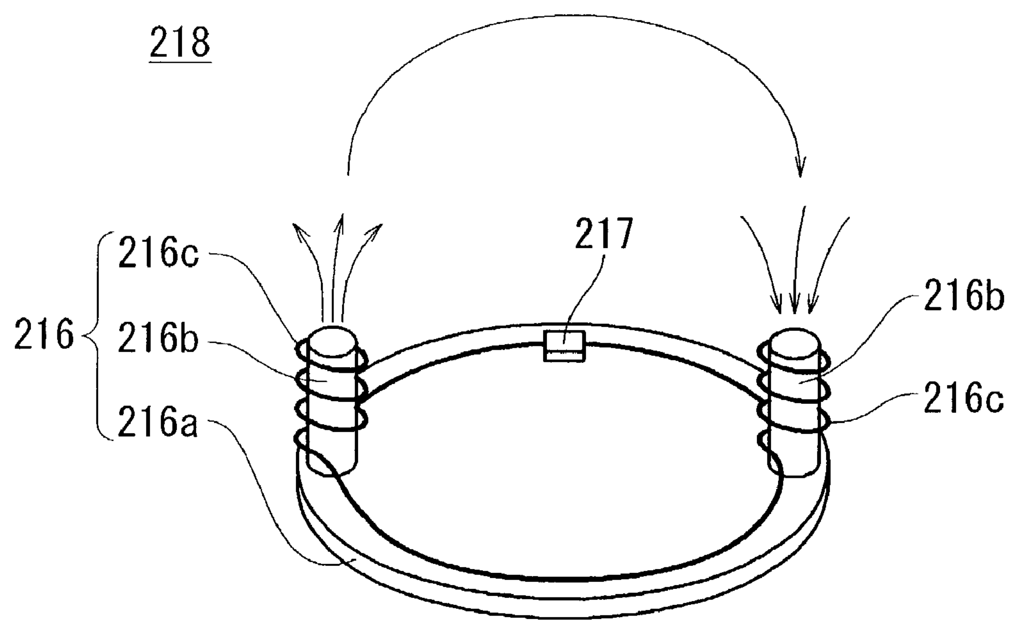
FIG. 8 is a sectional view showing an RFID tag of another preferred embodiment of the present invention.
Figure 9:
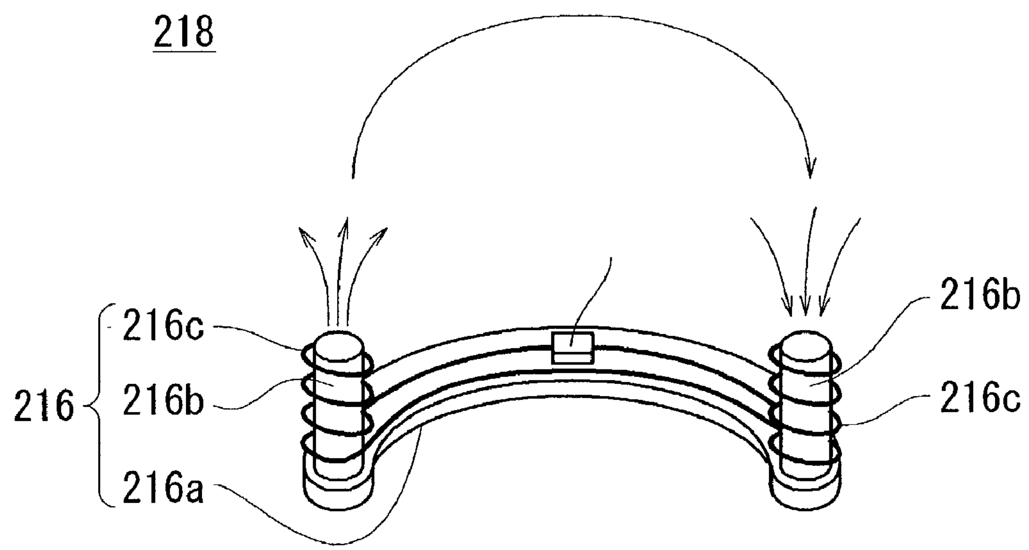
FIG. 9 is a sectional view showing an RFID tag of yet another preferred embodiment of the present invention.

It should be understood that, although in the above description of this preferred embodiment of the present invention the explanation described the watch case 212 as having a rear lid 212*c* formed in a circular plate shape from an electrically insulating material such a plastic or the like, as an alternative, it would also be acceptable to form this rear lid 212*c* from metal. Even if the rear lid 212*c* is formed from metal, it is possible to prevent deterioration of the sensitivity of the antenna 216 caused by the flow of eddy currents, since no substantial eddy currents flow in this rear lid 212*c*, due to the fact that the axis of magnetization of the magnetic backing 216*a* is parallel to this rear lid 212*c*. Moreover, although in the above description of this preferred embodiment the explanation described the magnetic backing 216*a* as being formed in a ring shape which could be inserted between the ring shaped case 212*a* and the drive section 213, it would also be acceptable for this magnetic backing 216*a* to be shaped in a plate shape, as shown in FIG. 8, provided that a gap was present between the drive section 213 and the rear lid 212*c*, and that it was possible to house the magnetic backing 216*a* within this gap. Furthermore, even if such a gap is not present, it will be acceptable to form the magnetic backing 216*a* in a circular arc shape, as shown in FIG. 9, located between the ring shaped case and the drive section 213, following around the inner surface of the ring shaped case 212*a*, provided that it is possible for the magnetic flux bundle which has entered into the magnetic backing 216*a* from one of the magnetic core members 216*b* to pass through it and emerge from the other magnetic core member 216*b*.

Figure 10:
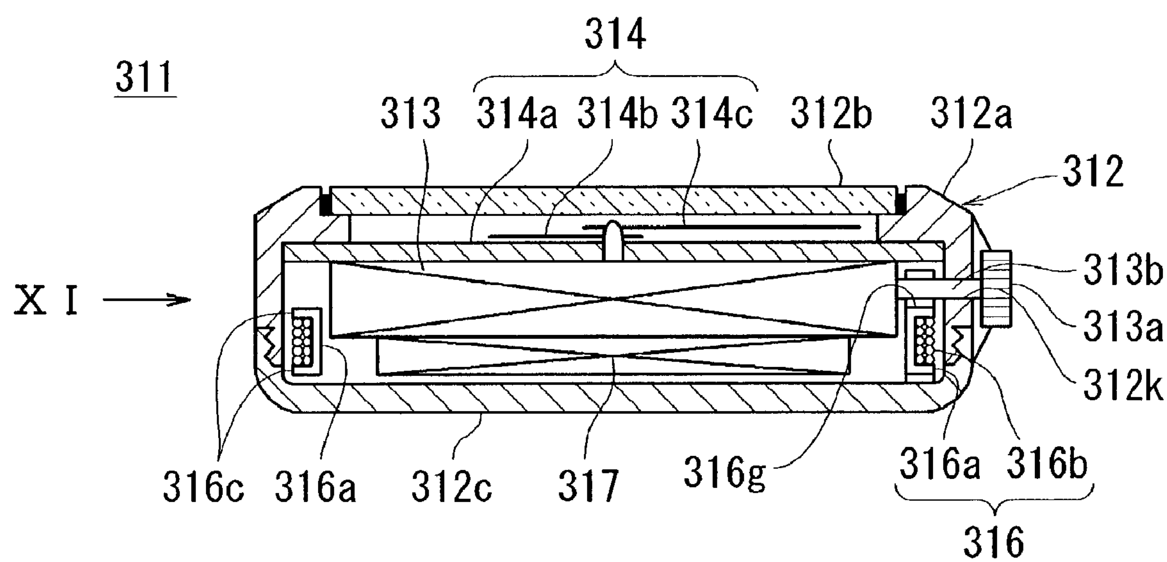
FIG. 10 is a sectional view showing a radio watch according to another preferred embodiment of the present invention.
Figure 13:
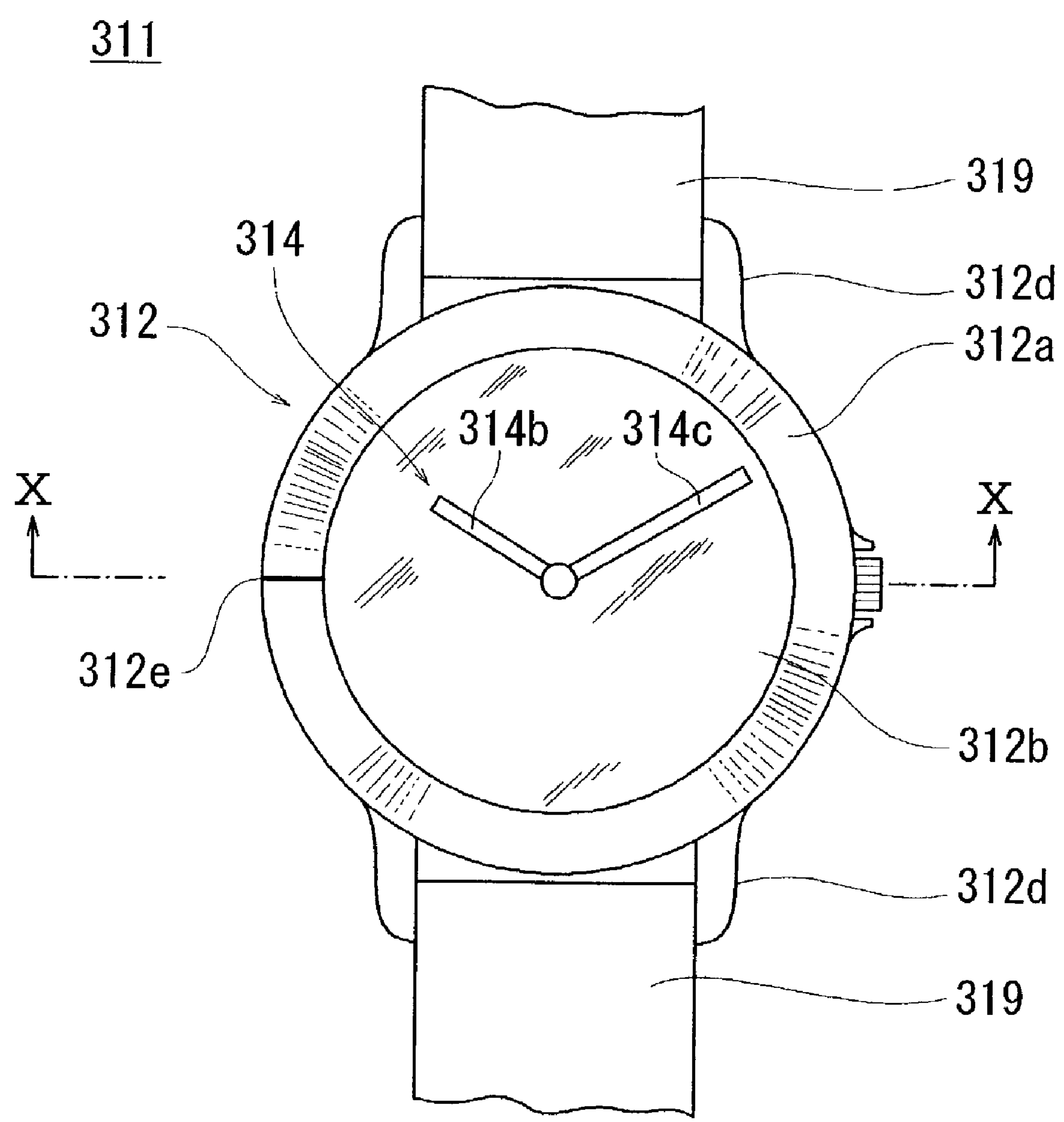
FIG. 13 is a plan view of a radio watch according to another preferred embodiment of the present invention.

FIG. 10 and FIG. 13 show a wrist watch type radio watch 311 according to another preferred embodiment of the present invention. This radio watch 311 comprises a watch case 312, a drive section 313 which is housed within the case 312 (see FIG. 10), a display section 314 which is driven by the drive section 313 and displays a time instant, an antenna 316 which receives radio waves which include time instant information, and a controller 317 which is housed in the case 312 and which controls the drive section 313 based upon the detected output of the antenna 316. As shown in FIG. 10, the case 312 comprises a ring shaped case 312*a*, a glass lid 312*b*, and a rear lid 312*c*. The ring shaped case 312*a* is formed in an annular shape and is made from metal; the glass lid 312*b* is formed in a circular plate shape and is made from an electrically insulating material (in this case, glass); and the rear lid 312*c* is formed in a circular plate shape and is made from an electrically insulating material such as plastic or the like. And the display section 314 comprises a face plate 314*a* for displaying characters, and a short hand

314*b*, a long hand 314*c* and a second hand not shown in the figures, which are driven by the drive section 313 and which rotate over the face plate 314*a*; and the current instant of time is displayed by the drive section 313 rotating this short hand 314*b*, long hand 314*c*, and second hand over the face plate 314*a*. The drive section 313 is externally formed as a rectangular parallelepiped, and the controller 317 is provided as a superimposed layer on the rear lid side 312*c* of this drive section 313. The drive section 313 is made so that the rotational positions of the short hand 314*b* and the long hand 314*c* of the display section 314 can be altered by rotation of a winding knob 313*a*. The winding knob 313*a* is connected to the drive section 313 via a support shaft 313*b*, and this support shaft 313*b* passes through a support shaft hole 312*k* which is formed in the case 312 and supports the winding knob 313*a* so that it is rotatable from the outside of the case 312.

The antenna 316 comprises a magnetic core member 316*a* which is formed in a ring shape so as to follow around the inner surface of the ring shaped case 312*a* and surround the drive section 313, and a coil 16*b* which is wound around the outer periphery of this magnetic core member 316*a* so as likewise to follow around the inner surface of the ring shaped case 312*a* and surround the drive section 313. It is desirable for the magnetic core member 316*a* to be formed in a ring shape by layering together several layers of a ferrite or of an amorphous foil, or to be formed in a ring shape from a composite material which is made from a plastic and a powder or flakes of a metal which is magnetic, or of ferrite. For the plastic in this composite material, it is possible to use a thermoplastic plastic whose workability is good, or a thermosetting plastic whose heat resistance is good. Furthermore, for the metallic powder in this composite material, an atomized powder or a reduced iron powder such as carbonyl iron powder or iron-permalloy or the like may be used. On the other hand, for the metallic flakes in this composite material, it is possible to use flakes which are obtained by forming a powder by finely grinding the above described powder with a ball mill or the like, and then mechanically flattening this powder, or flakes which are obtained by colliding molten particles of an iron type or a cobalt type amorphous alloy with water cooled copper.

Figure 12:
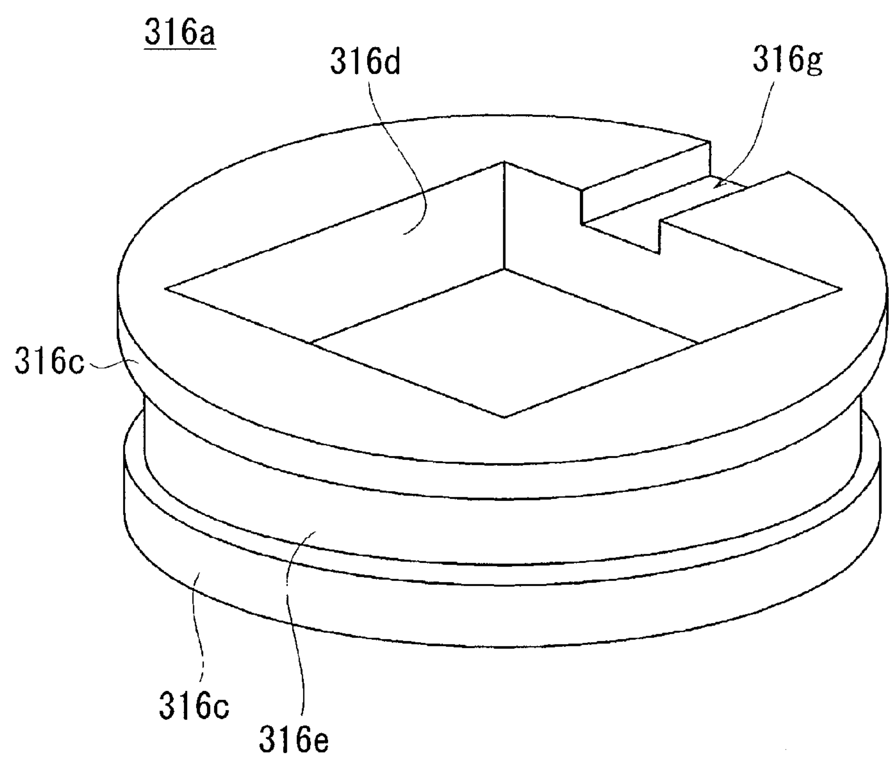
FIG. 12 is a perspective view of a magnetic core member thereof which is formed so as to surround a drive section thereof.

The magnetic core member 316*a* in this preferred embodiment is made by injection molding or compression forming, and is formed into a bobbin shape which includes two winding cases 316*c* for the coil 316*b*. To explain this bobbin shaped magnetic core member 316*a* in this preferred embodiment in more detail: as shown in FIG. 12, it is generally formed as a circular plate, with a square hole 316*d* whose shape corresponds to the external shape of the drive section 313 being formed in its center, so that the drive section can be laid into this square hole 316*d*; and the pair of winding cases 316*c* are formed around its entire circumference, upon the upper edge and the lower edge of its circular plate periphery. And thus it is made so that it is possible to wind the coil 316*b* in a convex groove 316*e* which is defined around the circumferential direction of this magnetic core member 316*a* between the pair of winding cases 316*c* which are formed around the upper edge and the lower edge of its circular plate periphery. A depression 316*g* is formed in the upper surface of the magnetic core member 316*a*, and a support shaft 313*b* which supports a winding knob 313*a* can be rotatably inserted in this depression 316*g*. To return to FIG. 10, the coil 316*b* is wound around the outer periphery of the magnetic core member 316*a*, so as to follow around the inner surface of the ring shaped case 312*a* and to surround the drive section 313, and it is so arranged that the central axial line of the antenna 316 which includes this coil 316*b* is perpendicular to the face plate 314*a*.

The two ends of the coil 316*b* are electrically connected to a condenser (not shown in the figures) and to a controller 317, and the antenna 316 is housed within the watch case 312 by inserting it into the ring shaped case 312*a* from the side of the rear lid 312*c* so that the support shaft 313*b* is rotatably supported in the depression 316*g* of the magnetic core member 316*a*. The above described antenna 316 and condenser form a resonant circuit which resonates at a predetermined radio frequency. A switch which can turn this resonant circuit on and off is provided to this resonant circuit, and it is arranged for this switch to be turned ON by the controller 317 every time that a predetermined time period elapses. The above described predetermined frequency is 40 kHz, and this radio signal is a radio signal which includes time instant information for the standard time in the current time zone and is generated based upon an atomic clock maintained by a communication authority (in the following, this radio signal will be termed a "standard radio signal"). It should be understood that the reference symbols 312*d*, 312*d* in FIG. 13 denote two pairs of mounting arms which project from the ring shaped case 312*a* of the wrist watch, and between each pair of which one of the two ends of a wrist band 319 is pivotally mounted.

Figure 11:
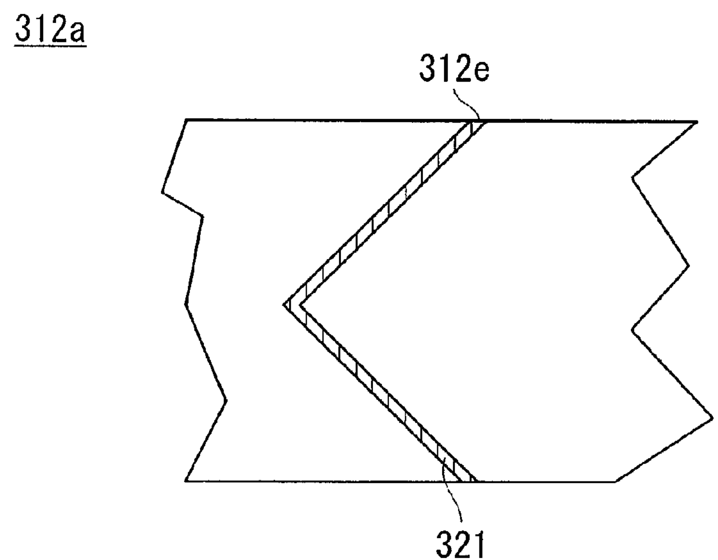
FIG. 11 is a side view of a ring shaped case thereof as seen from the direction XI in FIG. 10.

As shown in FIG. 13, a first slit 312*e* is formed in the ring shaped case 312*a*. This first slit 312*e* is formed so as to cut through the ring shaped case 312*a* in at least one place, and, in this preferred embodiment, a ring shaped case 312*a* is shown which has such a first slit in just one place. This first slit 312*e* is formed by cutting through the ring shaped case 312*a* by a means such as a fine grindstone, a wire cutter for electric discharge machining, or a wire cutter fitted with abrasive grains or the like, and, in this preferred embodiment, as shown in FIG. 11, the sectional surface defined by where the two sides of the first slit 312*e* oppose one another is divided so as to consist of two sectional planes which are connected together at an angle. Electrically non conductive resin 321 is filled into this first slit 312, and the two opposing sides of the first slit 312*e* are adhered together by this electrically non conductive resin 321.

The operation of this wrist watch type radio watch structured as described above will now be explained.

The owner of this wrist watch 311 puts it on by attaching it to his wrist via the band 319, 319. In this case, with the wrist watch type radio watch 311 according to this preferred embodiment of the present invention, since when he has thus put the watch 311 onto his wrist the ring shaped case 312*a* which appears at the periphery of the glass lid 312*b* is formed from a metallic material, accordingly it is possible for this wrist watch 311 to project a genuinely high quality feeling. Furthermore, since the antenna 316 is housed between the inner surface of the ring shaped case 312*a* and the drive section 313, it becomes possible to make the axial line of the band 319 and the central axis of the case 312 agree with one another, and, by making the external appearance of this wrist watch type radio watch to be the same as that of a conventional wrist watch, it is possible to enhance its attractiveness in terms of external appearance, as compared with the prior art. Furthermore, with the radio watch 311 of the present invention, since the two opposing sides of the first slit 312*e* which divides the ring shaped case 312*a* are mutually adhered together by the electrically non conductive resin 321, thereby no deterioration of the strength of the ring shaped case 312*a* is caused by the formation of the first slit 312*e*, and thus it is possible to ensure genuine durability for the watch case 312.

When the predetermined time period has elapsed, the controller 317 receives the standard radio signal by turning the switch ON, the resonant circuit constituted by the antenna 316 and the condenser resonates with the standard radio signal. At this time, since the rear lid 312*c* of the wrist watch 311 is made from a material which is electrically insulating, the antenna 316 which this rear lid 312*c* keeps housed in the watch case 312 is not prevented from receiving the radio signal which it should receive, and the standard radio signal passes through the glass lid 312*b* and the rear lid 312*c* of the watch case 312 and is received by the antenna 316. Since the antenna 316 is provided with the coil 316*b* which is wound so as to follow along the inner surface of the ring shaped case 312*a* and surround the drive section 313, the axis of magnetization of this antenna 316 is perpendicular to the face plate 314*c*, and accordingly the sensitivity of the antenna 316 is enhanced. Furthermore, since the first slit 312*e* is formed in the ring shaped case 312*a* in at least one place, thereby no induced electrical current flows in the case member 312*a*; and in particular, with this preferred embodiment, the reception sensitivity of the antenna 316 itself is enhanced, this antenna 316 receives the standard radio signal efficiently, and the resonant circuit made up from the antenna 316 and the condenser resonates reliably, since the antenna 316 comprises the magnetic core member 316*a*. By the resonant circuit resonating, the controller 317 reads in the time instant information which is included in the above described standard radio signal, controls the drive section 313, and corrects the display section 314.

Figure 14:
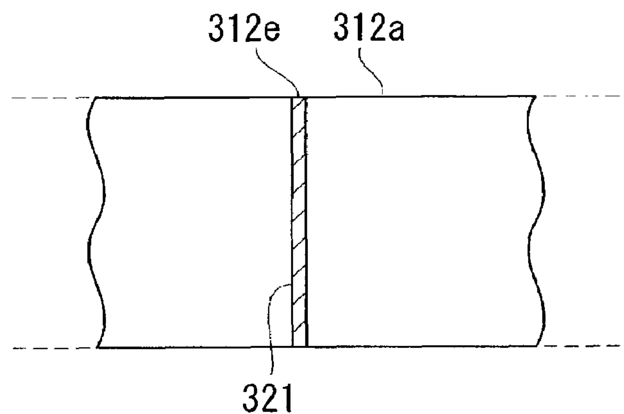
FIG. 14 is a side view showing a slit of which the single plane is defined by opposing sectional planes.
Figure 15:
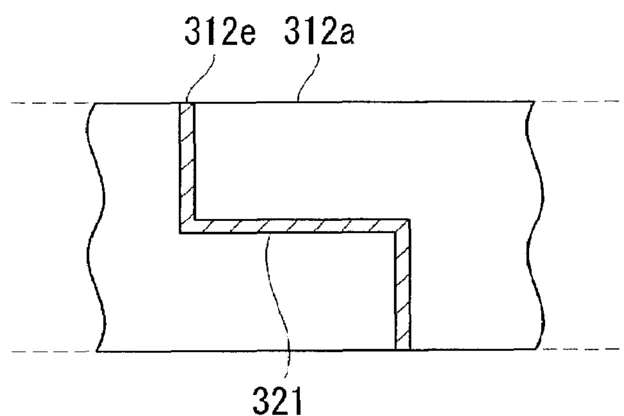
FIG. 15 is a side view showing a slit of which three sectional planes are defined by opposing sectional planes.

It should be understood that, although in the above description of this preferred embodiment the explanation has been made in terms of the first slit 312*e* being defined by two connected sectional planes at an angle to one another, it would alternatively be acceptable, as shown in FIG. 14, for this first slit 312*e* to be defined by a single sectional plane with its two sides opposing one another, or, as shown in FIG. 15, for it to be defined by three sectional planes arranged in a step configuration, again with its two sides opposing one another. Furthermore, although such possibilities are not shown in the figures, it would also be possible for the first slit 312*e* to be defined by a plurality such as four, five, or six sectional planes connected together.

Yet further, although in the above description of this preferred embodiment of the present invention the explanation has been made in terms of the first slit 312*e* being formed in one place upon the ring shaped case 312*a*, it would also be possible for the first slit 312*e* to be formed in two or more places. However, if the first slit 312*e* is formed in two or more places in this manner, then the ring shaped case 312*a* comes itself to be formed from a plurality of portions, and accordingly, since it is necessary to enhance the mechanical strength of this ring shaped case 312*a*, it is desirable for each of these first slits 312*e* to be defined by a plurality of sectional planes which are connected together, and to adhere the plurality of members strongly mutually together by charging electrically non conductive resin 321 into these first slits 312*e*.

Figure 16:
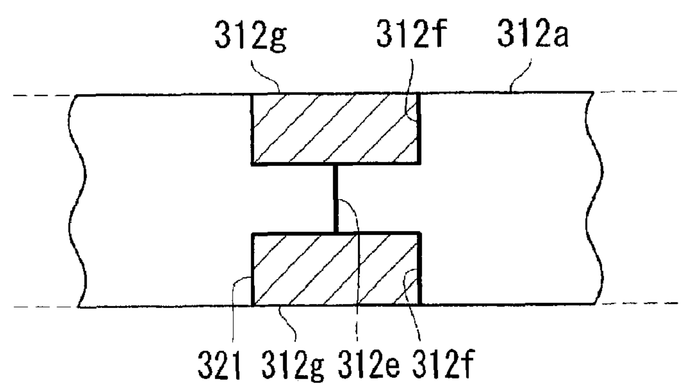
FIG. 16 is a side view showing the state in which an inlay member is adhered to a concave portion of a ring shaped casing.

Yet further, although in the above description of this preferred embodiment of the present invention the explanation has been made in terms of the first slit 312*e* being formed in the ring shaped case 312*a*, it would also be possible for concave portions 312*f*, 312*f* to be formed either in the front surface or in the back surface of the ring shaped case 312*a*, or as shown in FIG. 16 in both the front surface and in the back surface of the ring shaped case 312*a*, and for the first slit 312*e* to be formed in a position opening onto these concave portions 312*f*, 312*f*, with inlay members 312*g*, 312*g* which are made of the same material as the ring shaped case 312*a* being adhered via electrically non conductive resin 321 into these concave portions 312*f*, 312*f*. Even though the inlay members 312*g*, 312*g* are adhered in this manner, if the non electrically conductive resin 321 is interposed between these inlay members 312*g*, 312*g* and the concave portions 312*f*, 312*f*, no induced electrical currents flow in the case member 312*a*. Nevertheless, it is possible to cover up the first slit 312*e* with the inlay members 312*g*, 312*g* by adhering the inlay members 312*g*, 312*g* which are made of the same material as the ring shaped case 312*a* into the concave portions 312*f*, 312*f*, so that it is possible to prevent the appearance of the first slit 312*e* itself upon the outside of the watch 311, and thereby it is possible to enhance the attractiveness of the external appearance of the wrist watch 311 as a whole.

Yet further, although in the above description of this preferred embodiment of the present invention the explanation has been made in terms of the magnetic core member 316*a* being made by injection molding or by compression forming the composite material, it would also be acceptable, if the gap between the inner surface of the ring shaped case 312*a* and the outer peripheral surface of the drive section 313 is comparatively small, to make the magnetic core member 316*a* by winding a magnetic coated film in a ring shape. The magnetic coated film in this case is formed by slush drying a paste made from an ink or a paint containing a powder or flakes made from a magnetic material upon an electrically insulating film; and it would be acceptable to wind the electrical insulating film which was used for slushing together with the magnetic coated film upon it, or it would be acceptable to wind only the magnetic coated film, after having stripped it from the electrically insulating film. Here, for the powder or flakes of a magnetic material contained in the ink or paint, it is possible to utilize the same material as was used in the composite material described earlier. The thickness of the magnetic coated film which is formed is desirably from 10 to 800 $\mu$m, and more desirably is from 30 to 300 $\mu$m. It should be understood that, if only a single application of the paint is not sufficient for obtaining the specified thickness, it is possible to obtain a coated film of the desired thickness by repeatedly slush drying layers of the same paint, and it becomes possible to adjust the thickness of the portion which has been wound by increasing or decreasing the number of these magnetic coated films which are wound. The thickness of the magnetic core member 316*a* which has been obtained by winding these magnetic coated films can become extremely thin, and it is possible to obtain a magnetic core member 316*a* having a thickness of less than or equal to 0.8 mm in this manner, which would be difficult to form by injection molding. Due to this, it is possible to house the antenna 316 which incorporates the magnetic core member 316*a* within the gap between the inner surface of the ring shaped case 312*a* and the outer peripheral surface of the drive section 313, even if this gap is comparatively small.

Next, a variant of the above described preferred embodiment will be explained. Portions which are the same in this variant embodiment as ones shown and described above are designated by reference numerals increased by 100 or 200 in the figure, and repetitive explanation thereof will be curtailed.

Figure 17:
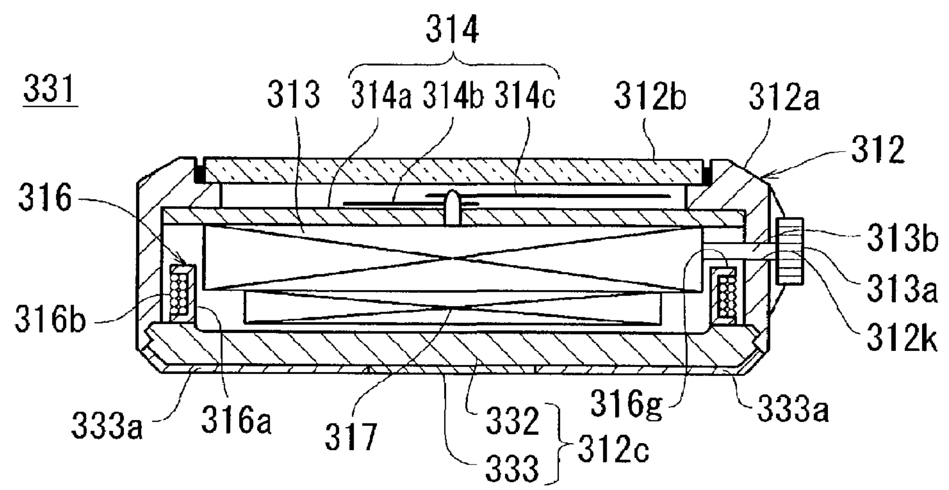
FIG. 17 is a sectional view of a radio watch according to another preferred embodiment of the present invention.
Figure 18:
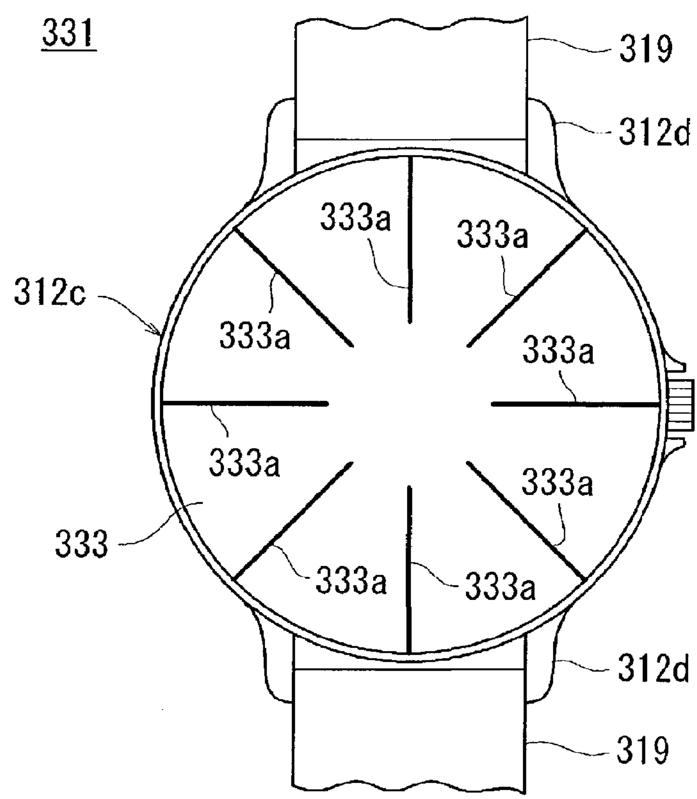
FIG. 18 is a rear view of this wrist watch.

As shown in FIG. 17 and FIG. 18, in the wrist watch type radio watch 331 according to this preferred embodiment of the present invention, a first slit which is not shown in the figures is formed in a portion of the ring shaped case 312*a*, while the glass lid 312*b* is formed from an electrically insulating material (in this case, a glass plate) in a circular plate shape. The rear lid comprises a non metallic main lid 332 which is made so as to be able to seal the rear side of the ring shaped case 312*a*, and a supplementary metallic lid 333 which is adhered to the outer surface of the non metallic main lid 332 so as to cover over this outer surface. The non metallic main lid 332 is formed by injection molding or compression forming a resin which is an electrically insulating material, and the supplementary metallic lid 333 is made by sheet metal working a plate member made from a metal. The supplementary metallic lid 333 is adhered to the non metallic main lid 332 and constitutes the outer surface of the radio watch 331, and so the radio watch 331 presents a really high quality feeling due to the fact that this supplementary metallic lid 333 presented to the exterior is made from metal. Moreover, one, or two or more, second slits 333*a* are formed in this supplementary metallic lid 333.

Thus, with regard to this second slit 333*a*, in this preferred embodiment, by way of example, as shown in FIG. 18, the case is shown in which a total of eight second slits 333*a* are formed in an arrangement radiating from the center of the supplementary metallic lid 333. After adhering the supplementary metallic lid 333 to the non metallic main lid 332, these second slits 333 a are formed by cutting through certain portions of said supplementary metallic lid 333 in a radiating arrangement by a cutting means such as a fine grindstone, a so called wire cutter for electric discharge machining, or a wire cutter fitted with abrasive grains or the like. A non electrically conductive resin is filled into these second slits 333*a*, and the second slits 333*a* of the supplementary metallic lid 333 which constitutes the external surface of the rear lid 312*c* serve as a smooth surface, due to this non electrically conductive resin.

Since, with the radio watch 331 according to this preferred embodiment of the present invention, the supplementary metallic lid 333 which appears at the periphery of the glass lid 312*b* when it has been put on to the wrist of the user is made from a metallic material, accordingly this radio watch 331 projects a feeling of really high quality. Furthermore, with the radio watch 331 according to the present invention, since a non electrically conductive resin is filled into the second slits 333*a* which are formed in the supplementary lid 333, therefore there is no deterioration of the strength of the supplementary lid 333 caused by the formation of these second slits 333*a*, and a high level of durability for the watch case 312 is ensured.

Furthermore, although with this radio watch 331 the supplementary metallic lid 333 which constitutes its rear lid is formed from a metallic substance, since the eight second slits 333*a* are formed in this supplementary metallic lid 333 in a radiating arrangement, therefore the standard radio signal is able to pass through these second slits 333*a*, and the rear lid which includes this supplementary metallic lid 333 does not impede the passage of the radio waves which are to be received by the antenna 316 which is housed in the watch case 312. Furthermore, since at least the one end portions of the second slits 333 a reach the outer edge of the supplementary metallic lid 333, accordingly the flow of ring shaped induced electrical currents when the antenna 316 has received the standard radio signal is prevented, so that deterioration of the sensitivity of the antenna is prevented, and the resonant circuit which is made up from the antenna 316 and the condenser resonates reliably.

Figure 19:
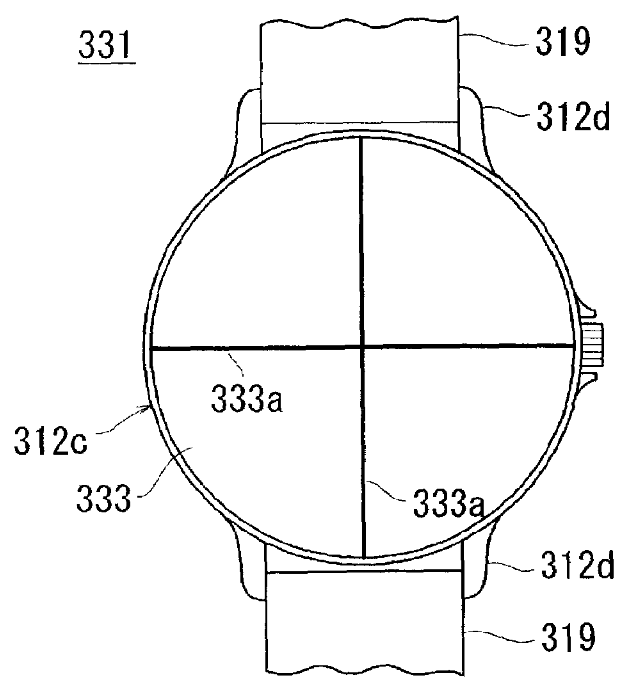
FIG. 19 is a rear view of a radio watch which incorporates a rear lid having two second slits at right angles to one another.

It should be understood that, although in the above description of this preferred embodiment of the present invention the explanation was made in terms of using the supplementary lid 333 in which the eight second slits 333*a* were formed in a radiating arrangement from its center, it would also be acceptable, as an alternative, for the second slits 333*a* to be unified into one long transverse slit that divided the supplementary metallic lid 333 into two pieces; or, as shown in FIG. 19, for the second slits 333*a* to be combined into two mutually perpendicular long transverse slits that divided the supplementary metallic lid 333 into four pieces. Furthermore, it would also be acceptable for the slits 333*a* not to be arranged in a radiating pattern, provided that they stopped the flow of ring shaped induced electrical currents in the metallic supplementary lid 333; and, if the second slits 333*a* are in fact arranged in a radiating pattern, the number of them which are provided may be 2, 3, 4, 5, 6, 7, 9, 10, or a greater number.

Figure 20:
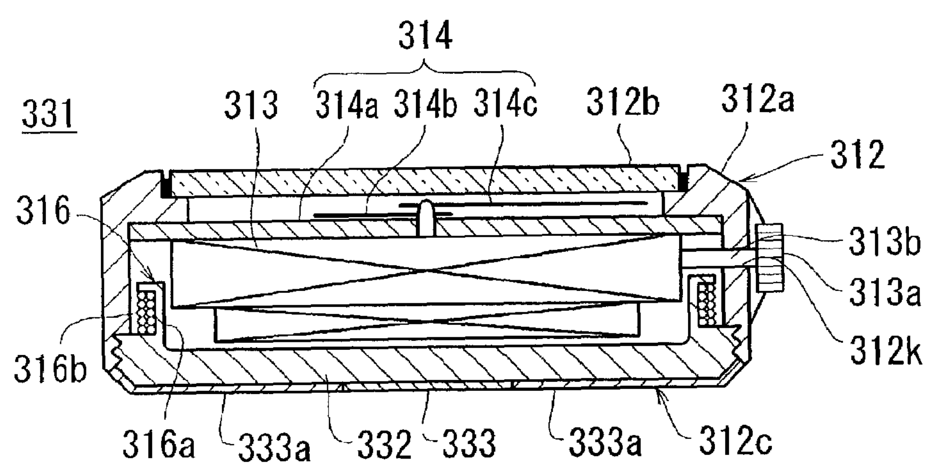
FIG. 20 is a sectional view showing a radio watch in which a magnetic core member and a non-metallic main lid thereof are formed as a unit.

Furthermore, although in the above description of this preferred embodiment of the present invention the explanation was made in terms of using the antenna 316 in which the coil 316*b* was wound around the outer periphery of the magnetic core member 316*a* which was formed as a separate member independently from the non metallic man lid 332, it would also be acceptable, as shown in FIG. 20, as an alternative, with the magnetic core member being formed by injection molding or compression forming a composite material, to form the magnetic core member 316*a* and the non metallic main lid 332 integrally as one member by compression forming or injection molding this composite material. If the magnetic core member 316*a* and the non metallic main lid 332 are formed integrally in this manner, the manufacturing process is simplified as compared with the case of making the core member 316*a* and the non metallic main lid 332 individually by separate and independent processes, and moreover the management burden for forming the magnetic core member 316*a* and the non metallic main lid 332 separately is also reduced, so that as a result it is possible to produce a radio watch at a comparatively cheap price.

Furthermore, although in the above description of this preferred embodiment of the present invention the explanation was made in terms of using a rear lid which was made up of the non metallic main lid 332 and the supplementary metallic lid 333 adhered to the outer surface of this non metallic main lid 332, it would also be acceptable, as an alternative, for the rear lid to be a single metallic main lid which was made so as to be able to seal the rear side of the ring shaped case 312*a*. Even if a metallic main lid is used, it is possible to prevent the flow of ring shaped induced electrical currents in the periphery of the metallic main lid when receiving the radio signal, provided that this metallic main lid is formed with one, or two or more, second slits, at least one of the end portions of which reaches to the outer edge of this metallic main lid; and accordingly it is possible to avoid a situation developing in which the radio waves are cancelled out by such induced electrical currents.

Figure 21:
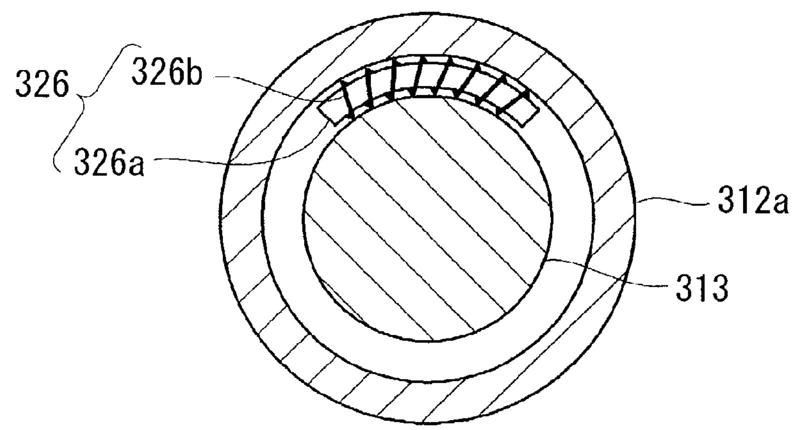
FIG. 21 is a structural diagram showing a radio watch which internally houses an antenna which has a rod shaped magnetic core member.

Yet furthermore, although in the above description of this preferred embodiment of the present invention the explanation was made in terms of using the antenna 316 which comprised the magnetic core member 316*a* which was formed in a ring shape so as to follow around the inner surface of the ring shaped case 312*a* and to surround the drive section 313, and the coil 316*b* which was wound around the outer periphery of this magnetic core member 316*a* so as to follow around the inner surface of the ring shaped case 312*a* and to surround the drive section 313, it would also be acceptable, as an alternative, if the gap between the inner surface of the ring shaped case 312*a* and the outer peripheral surface of the drive section 313 is comparatively large, as shown in FIG. 21, to house an antenna 316 which comprises a magnetic core member 326*a* which is formed in a rod shape bent along the inner surface of the ring shaped case 312*a*, and a coil 326*b* which is wound in a helical shape about this magnetic core member 326*a*, between the inner surface of the ring shaped case 312*a* and the drive section 313. In this case as well, by making the external appearance of this wrist watch type radio watch to be the same as the external appearance of a conventional wrist watch, it is possible to increase the quality of its impressive external appearance to be higher than with the prior art, and moreover, provided that the ring shaped case 312*a* is provided with the first slit 312*e*, or the ring shaped case 312*a* and the rear lid 312*c* are provided with the first and second slits 312*e* and 333*a*, this ring shaped case 312*a* and rear lid 312*c* do not present any barrier to the standard radio signal, and accordingly it is possible to prevent the flow of ring shaped induced electrical currents when the antenna 316 has received the standard radio signal, so that deterioration of the sensitivity of the antenna is prevented, and it is possible to ensure that the resonant circuit which is made up from the antenna 316 and the condenser resonates reliably.

Figure 22:
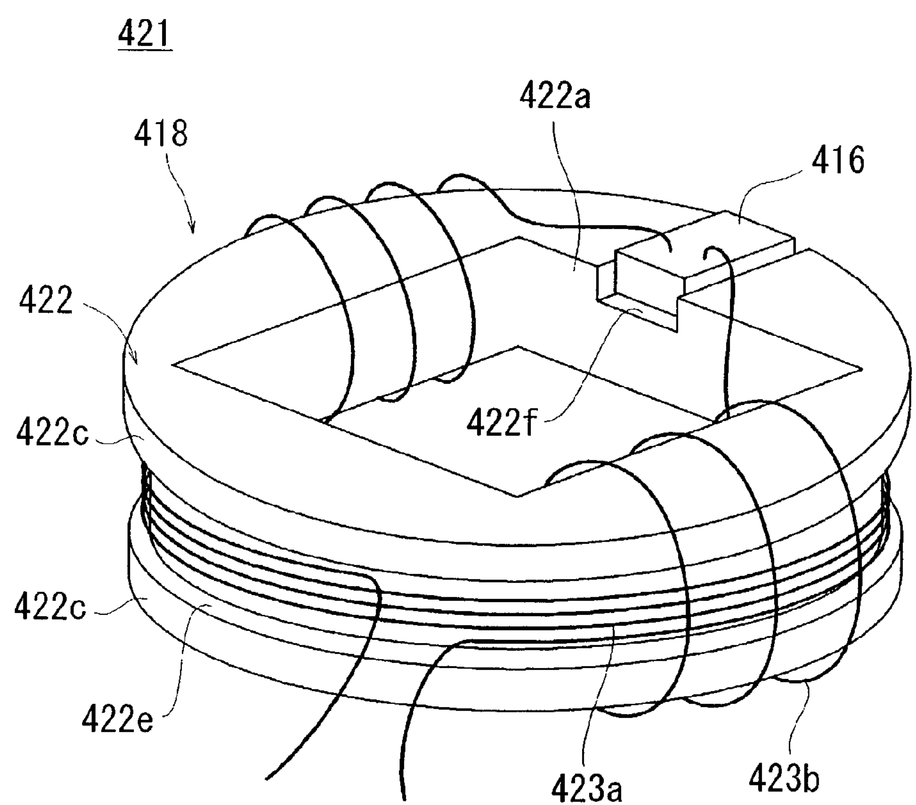
FIG. 22 is a perspective view showing an antenna of another preferred embodiment of the present invention.
Figure 23:
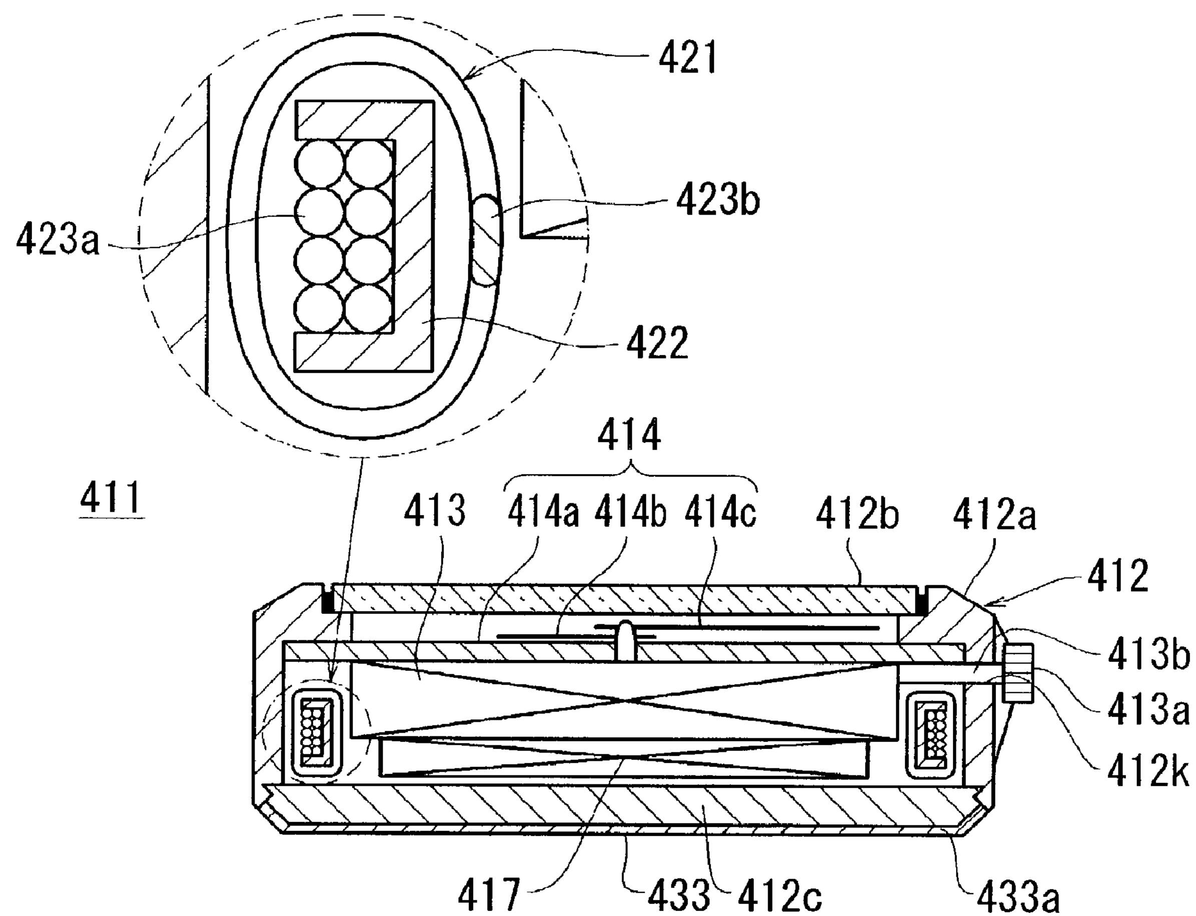
FIG. 23 is a sectional view of a wrist watch according to another preferred embodiment of the present invention, taken in a plane shown by the arrows XXIII—XXIII in FIG. 25.

Next, an antenna according to another preferred embodiment of the present invention will be explained. FIG. 22 shows this antenna 421 of this preferred embodiment. This antenna 421 includes a tag which utilizes the RFID technique, and moreover is housed within a wrist watch which is made so as to be able to correct the time instant by receiving a prescribed radio signal which includes time instant information. As shown in FIG. 23, this wrist watch 411 comprises a watch case 412, a drive section 413 which is housed in the case 412, a display section which is driven by the drive section 413 and displays the current time instant, and a controller 417 which controls the drive section 413 based upon the detected output of an antenna 421 which is housed in the case 412. The case 412 comprises a ring shaped case 412*a*, a glass lid 412*b* which seals the display side of this ring shaped case 412*a*, and a rear lid 412*c* which seals the rear side of this ring shaped case 412*a*.

As shown in FIG. 22, the antenna 421 comprises a magnetic core member 422 and coils 423*a* and 423*b*. The magnetic core member 422 is formed in a ring shape which can be inserted between the drive section 413 (see FIG. 23) which is housed in the case 412 in which there is formed a hole 422*a* into which the drive section 413 can be freely laid, and the ring shaped case 412*a* (see FIG. 23) which is comprised in the case 412. The magnetic core member 416*a* is formed in a ring shape by layering together several layers of a ferrite or of an amorphous foil, or is formed in a ring shape having the hole 422*a* into which the drive section 413 can be freely laid from a composite material which is made from a plastic and a powder or flakes of a metal which is magnetic, or of ferrite. For the plastic in this composite material, it is possible to use a thermoplastic plastic whose workability is good, or a thermosetting plastic whose heat resistance is good. Furthermore, for the metallic powder in this composite material, an atomized powder or a reduced iron powder such as carbonyl iron powder or iron-permalloy or the like may be used. On the other hand, for the metallic flakes in this composite material, it is possible to use flakes which are obtained by forming a powder by finely grinding the above described powder with a ball mill or the like, and then mechanically flattening this powder, or flakes which are obtained by colliding molten particles of an iron type or a cobalt type amorphous alloy with water cooled copper.

The magnetic core member 422 of this preferred embodiment is made by injection molding or compression forming the composite material, and is formed in a bobbin shape which is provided with winding cases 422*c* for the first coil 423*a*, as will be described hereinafter. To explain this bobbin shaped magnetic core member 422 of this preferred embodiment, it is formed in a circular plate shape, with a square hole 422*a* of a shape corresponding to the external shape of the drive section 413 and into which the drive section 413 can be freely laid being formed in its center, and with the winding cases 422*c* being formed all around the entire upper and lower edges of its circular plate periphery. Thus, the magnetic core member 422 is formed so that the first coil 423*a* can be wound, as will be described hereinafter, in a concave groove 422*e* which is defined between the two winding cases 422*c* which are formed around the upper edge and the lower edge of this magnetic core member 422, around its circumferential direction. In the upper surface of this magnetic core member 422 there is formed a depression 422*f* in which, along with a second coil 423*b* which will be described hereinafter, an IC chip 416 which comprises an identification tag 418 can be put.

With regard to the coil, this comprises the first coil 423*a* which is wound around the outer circumference of the magnetic core member 422, and a second coil 423*b* which is wound in a helical shape around the periphery of the magnetic core member 422. By the first coil 423*a* being wound around the outer circumference of the magnetic core member 422, it is arranged that, in the state with this antenna 421 is housed in the case 412, it follows around the inner surface of the ring shaped case 412*a* and surrounds the drive section 413, with the construction being such that the magnetic core axis of this first coil 423*a* coincides with the central axis of the magnetic core member 422. On the other hand, the second coil 423*b* is wound in a helical shape in the same direction to the left and right, excluding the sides which are defined by the depression 422*f* of the magnetic core member 422, and this second coil 423*b* is wound so as to take the ring shaped magnetic core member 422 as its magnetic core axis, which thus lies perpendicular to the magnetic core axis of the first coil 423*a*.

With the antenna 421 for a wrist watch constructed in this manner, it can combine the function of serving as an antenna for receiving the prescribed radio signal containing time instant information and also the function of serving as an antenna which includes the identification tang 418, since the first and second coils 423*a* and 423*b* are both wound upon the single magnetic core member 422. Accordingly, with the antenna 421 according to the present invention which has both of these functions, it is possible to avoid any requirement for enlargement of the space between the inner surface of the ring shaped case 412*a* and the drive section 413, as compared with the case in which an antenna for receiving the prescribed radio signal containing time instant information and an antenna which includes an identification tag are housed within the case of the watch while being provided independently and separately.

Furthermore, since the magnetic core axis of the first coil 423*a* and the magnetic core axis of the second coil 423*b* are at right angles to one another, it is possible to avoid any reaction from the magnetic flux bundle which is generated in either of these magnetic cores upon the other coil, and the first coil 423*a* and the second coil 423*b* can accurately receive the proper radio signals for which they were intended. Furthermore, with the antenna 421 according to this preferred embodiment of the present invention, it is easy to wind the first coil 423*a* which has a comparatively large number of turns, since the magnetic core member 422 is bobbin shaped. By contrast, although with the second coil 423*b* the necessity does arise for repeatedly passing the wire of which said second coil 423*b* is built through the square hole 422*a* in order to wind said second coil 423*b* in a helical shape upon the magnetic core member 422*b*, nevertheless, by selecting as this second coil 423*b* that one of the coils for which the number of turns required is the smaller, it is possible to reduce the trouble of winding this second coil 423*b* to the utmost. Furthermore, since the composite material is made by injection or compression forming, it becomes possible to obtain a magnetic core member 422 of any desired shape, and to obtain an antenna 421 at comparatively low cost.

It should be understood that, although in the above description of this antenna 421 according to a preferred embodiment of the present invention the explanation was made in terms of the magnetic core member 422 being made by injection molding or by compression forming the composite material, it would also be acceptable, if the gap between the inner surface of the ring shaped case 412*a* and the outer peripheral surface of the drive section 413 is comparatively small, to make the magnetic core member 422 by winding a magnetic coated film in a ring shape. The magnetic coated film in this case is formed by slush drying a paste made from an ink or a paint containing a powder or flakes made from a magnetic material upon an electrically insulating film; and it would be acceptable to wind the electrical insulating film which was used for slushing together with the magnetic coated film upon it, or it would be acceptable to wind only the magnetic coated film, after having stripped it from the electrically insulating film. Here, for the powder or flakes of a magnetic material contained in the ink or paint, it is possible to utilize the same material as was used in the composite material described earlier. The thickness of the magnetic coated film which is formed is desirably from 10 to 800 $\mu$m, and more desirably is from 30 to 300 $\mu$m. It should be understood that, if only a single application of the paint is not sufficient for obtaining the specified thickness, it is possible to obtain a coated film of the desired thickness by repeatedly slush drying layers of the same paint, and it becomes possible to adjust the thickness of the portion which has been wound by increasing or decreasing the number of these magnetic coated films which are wound. Furthermore, if the coated film is formed on both the sides of the electrical insulation film, the beneficial result is obtained of being able to obtain the prescribed thickness of varnish with half the thickness of film. The thickness of the magnetic core member 422 which has been obtained by winding these magnetic coated films can become extremely thin, and it is possible to obtain a magnetic core member 416*a* having a thickness of less than or equal to 0.8 mm in this manner, which would be difficult to form by injection molding. Due to this, it is possible to house the antenna 421 which incorporates the magnetic core member 422 within the gap between the inner surface of the ring shaped case 412*a* and the outer peripheral surface of the drive section 413, even if this gap is comparatively small.

A wrist watch 411 which includes the above described antenna 421 will now be described with reference to FIGS. 23 through 26.

Figure 25:
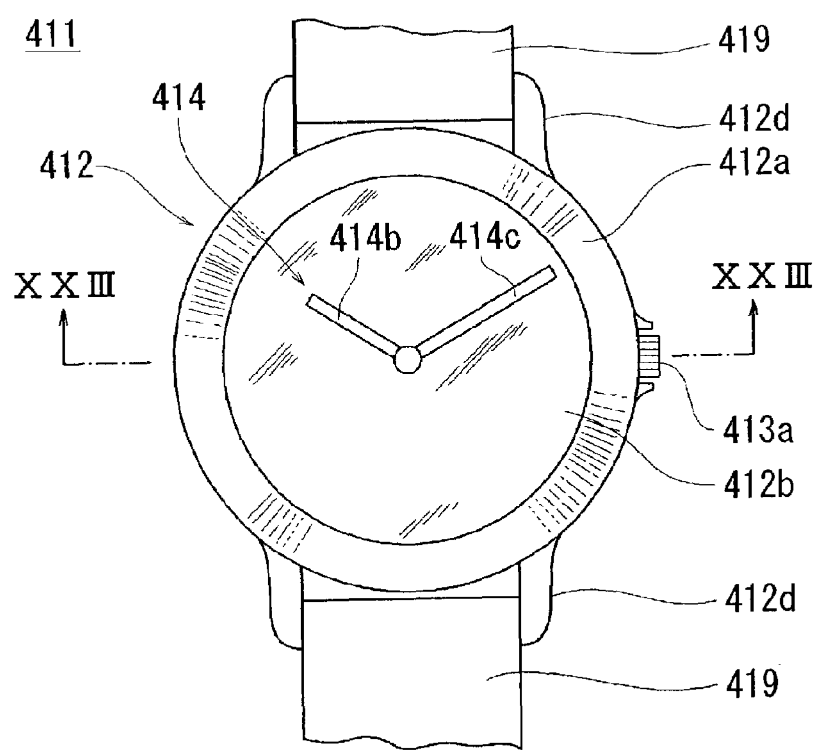
FIG. 25 is a plan view of this wrist watch.

As shown in FIG. 23, this wrist watch 411 comprises a watch case 412, a drive section 413, a display section 414, and a controller 417. The wrist watch 411 of this preferred embodiment is a comparatively inexpensive wrist watch 411 which belongs to the toy class, and a ring shaped case 412*a* and a rear lid 412*c* which are comprised in its case 412 are made from a non electrically conductive plastic, while a glass lid 412*b* is formed in a circular plate shape and is made from an electrically insulating material (in this case, glass). As shown in FIGS. 23 and 25, the display section 414 comprises a face plate 414*a* for displaying characters, and a short hand 414*b*, a long hand 414*c* and a second hand not shown in the figures, which are driven by the drive section 413 and which rotate over the face plate 414*a*; and the current instant of time is displayed by the drive section 413 rotating this short hand 414*b*, long hand 414*c*, and second hand over the face plate 414*a*. The drive section 413 is provided on the rear surface of the face plate 414*a*, and the controller 417 is further provided as a superimposed layer on the rear lid 412*c* side 412*c* of this drive section 413. The drive section 413 is made so that the rotational positions of the short hand 414*b* and the long hand 414*c* of the display section 414 can be altered by rotation of a winding knob 413*a*. The winding knob 413*a* is connected to the drive section 413 via a support shaft 413*b*, and this support shaft 413*b* passes through a support shaft hole 412*k* which is formed in the case 412 and supports the winding knob 413*a* so that it is rotatable from the outside of the case 412.

On the other hand, this wrist watch comprises an identification tag 418 which consists of the antenna 421 and an IC chip 416. As shown in FIG. 22, the IC chip 416 is laid into the depression 422*f* of the magnetic core member 422. The ends of the second coils 423*b* which are wound in helical shapes on the left and right sides of the magnetic core member 422 are mutually connected together, so as to connect said second coils 423*b* in series, and thereby a unified second coil 423*b* is formed. The two ends of this unified second coil 423*b* connected in series are electrically connected to terminals of the IC chip 416, and thereby the antenna 421 is constituted by the second coil 423*b* and the magnetic core member 422, with the identification tag 418 being constituted by this antenna 421 and IC chip 416.

Figure 26:
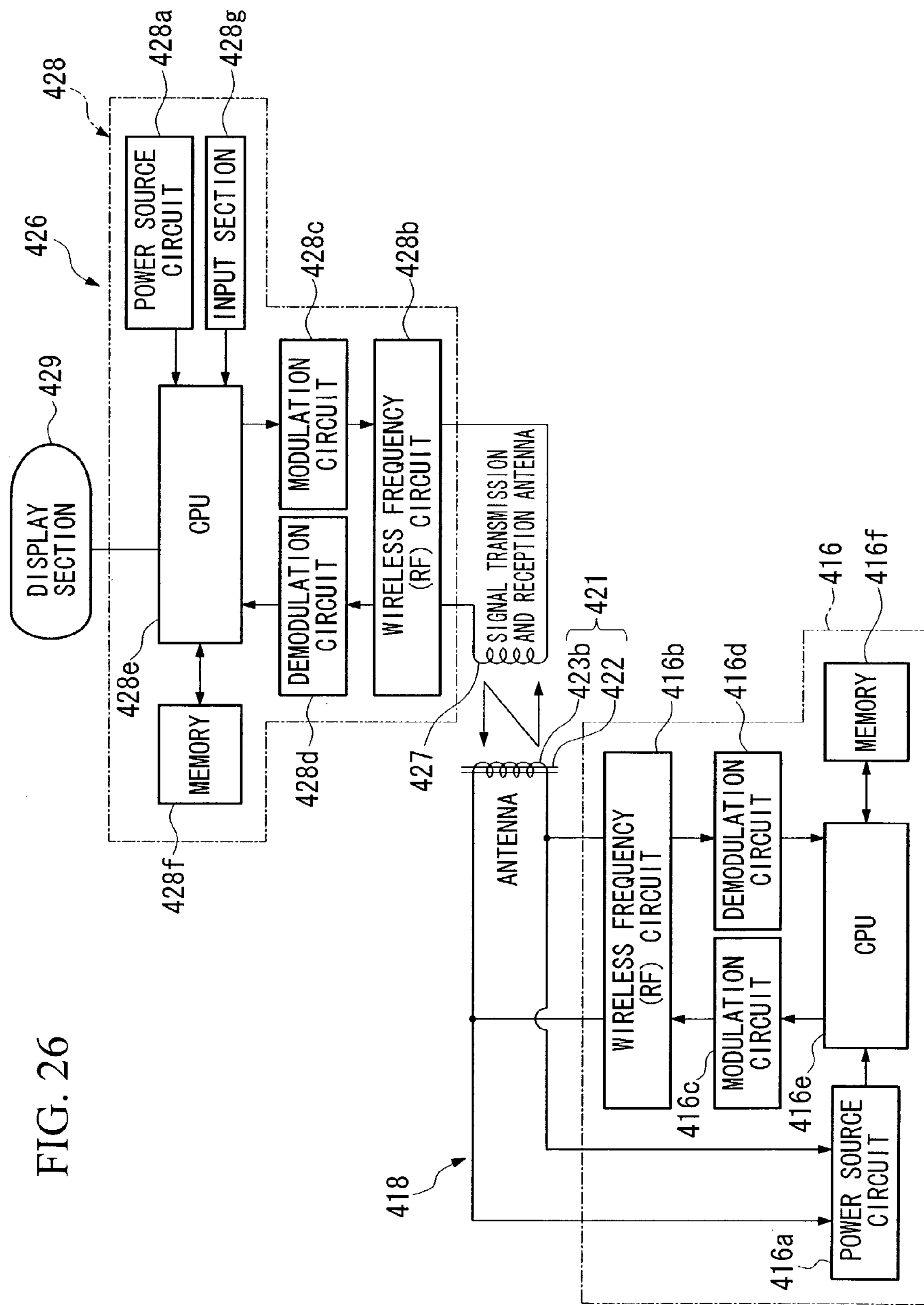
FIG. 26 is a block diagram showing the relationship between an identification tag and an identification means thereof.

As shown in FIG. 26, the IC chip 416 comprises a power source circuit 416*a*, a wireless frequency (RF) circuit 416*b*, a modulation circuit 416*c*, a demodulation circuit 416*d*, a CPU 416*e*, and a memory 416*f* which is connected to this CPU 416*e* and which stores information related to the owner of this wrist watch. The power source circuit 416*a* comprises a condenser (not shown in the figures), and this condenser forms a resonant circuit together with the antenna 421. When the antenna 421 receives a radio signal of a specified frequency (the frequency at which the above described resonant circuit resonates), electrical power which is generated by the action of mutual induction in said resonant circuit is charged into this condenser. The power source circuit 416*a* adjusts and stabilizes this electrical power and supplies it to the CPU 416*e*, so that the IC chip 416 is activated. The memory 416*f* comprises a ROM (read only memory), a RAM (random access memory), and an EEPROM (electrically erasable programmable read-only memory), and, under the control of the CPU 416*e*, said memory 416*f* performs reading out of stored data upon a read out command according to radio data communication from an identification means 426 which will be described hereinafter, and also performs writing in of data upon a write in command from the identification means 426.

To return to FIG. 23, both the ends of the first coil 423*a* which is wound around the outside of the magnetic core member 422 are electrically connected to a condenser (not shown in the figures) and to the controller 417, and in this state the unit is inserted into the ring shaped case 421*a* from the side of the rear lid 412*c*, so that thereby the antenna 421 which consists of the magnetic core member 422 and the first and second coils 423*a* and 423*b* is housed within the watch case 412. A resonant circuit which resonates at a predetermined frequency is thus constituted by the above described first coil 423*a* and the condenser, and the controller 417 is made so as to be turned ON whenever a predetermined time period elapses. Here, this predetermined frequency is 40 kHz, and this radio signal is a radio signal which includes time instant information for the standard time in the current time zone and is generated based upon an atomic clock maintained by a communication authority. It should be understood that the reference symbols 412*d*, 412*d* in FIG. 25 denote two pairs of mounting arms which project from the ring shaped case 412*a* of the wrist watch, and between each pair of which one of the two ends of a wrist band 419 is pivotally mounted.

Figure 24:
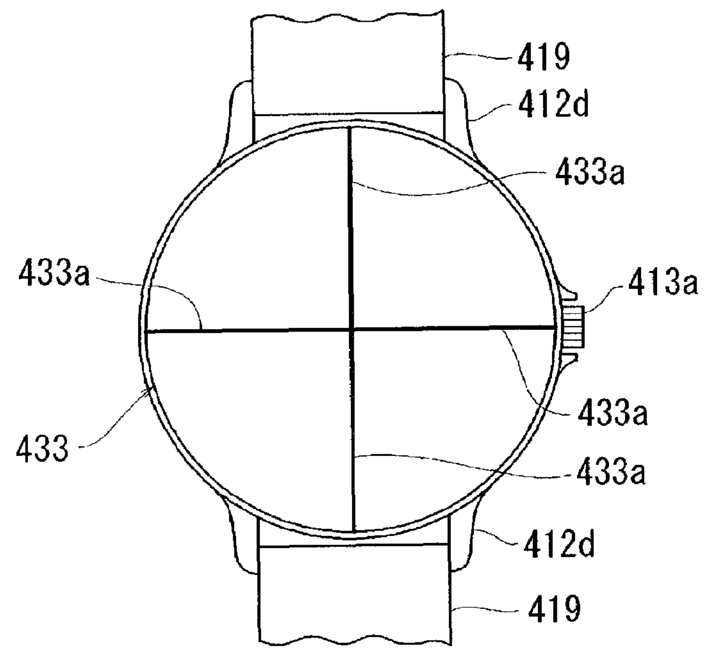
FIG. 24 is a rear view of this wrist watch.

As shown in FIG. 23 and FIG. 24, a supplementary metallic lid 433 is adhered to the outer surface of the rear lid 412*c*, and one or two or more second slits 433*a* are formed in this supplementary metallic lid 433 with at least one of their end portions reaching the outer edge of said supplementary metallic lid 433. In this preferred embodiment of the present invention, by way of example, two such second slits 433*a* are formed mutually at right angles to one another, so as to divide the supplementary metallic lid 433 into four quarters. After adhering the supplementary metallic lid 433 to the rear lid 412*c*, these second slits 433*a* are formed by cutting through certain portions of said supplementary metallic lid 433 in a radiating arrangement by a cutting means such as a fine grindstone, a wire cutter for electro discharge machining, or a wire cutter fitted with abrasive grains, or the like. A non electrically conductive resin is filled into these second slits 433*a*, and the second slits 433*a* of the supplementary metallic lid 433 which constitutes the external surface of the rear lid 412*c* serve as a smooth surface, due to this non electrically conductive resin.

The operation of the radio watch constituted in this manner will now be described.

The owner of this wrist watch 411 puts it on by attaching it to his wrist via the band 419, 419. In this case, with the wrist watch 411 according to this preferred embodiment of the present invention, since both the ring shaped case 412*a* and the rear lid 412*c* are formed from a plastic of comparatively low cost, accordingly it is possible to obtain a wrist watch which has a comparatively complex structure and moreover is of comparatively low cost. Furthermore, since the supplementary metallic lid 433 is adhered to the outer surface of the rear lid 412*c*, it is possible to enhance the durability of this portion. Yet further, since the antenna 421 is housed between the inner surface of the ring shaped case 412*a* and the drive section 413, it becomes possible to make the axial line of the band 419 and the central axis of the case 412 agree with one another, and, by making the external appearance of this wrist watch type radio watch to be the same as that of a conventional wrist watch, it is possible to enhance its attractiveness in terms of external appearance, as compared with the prior art.

When the predetermined time period has elapsed, the controller 417 receives the standard radio signal by turning the system ON, and the resonant circuit constituted by the antenna 421 containing the first coil 423*a* and the condenser not shown in any figure resonates with the standard radio signal. In this preferred embodiment of the present invention, since the supplementary metallic lid 433 is adhered to the outer surface of the rear lid 412*c*, and since the second slits 433*a* are formed in this supplementary metallic lid 433, thereby the supplementary metallic lid 433 does not constitute any barrier to the radio waves which are to be received by the antenna 421 which includes the first coil 423*a*, so that the standard radio signal passes through the watch case 412 and is received by the antenna 421. Since the antenna 421 is provided with the first coil 423*a* which is wound so as to follow along the inner surface of the ring shaped case 412*a* and surround the drive section 413, the axis of magnetization of this antenna 421 is perpendicular to the face plate 414*c*, and accordingly the sensitivity of the antenna 421 is enhanced. Furthermore, since the first slit 412*e* is formed in the ring shaped case 412*a* in at least one place, thereby no induced electrical current flows in the case member 412*a*. And, in particular, with this preferred embodiment, the reception sensitivity of the antenna 421 itself is enhanced, this antenna 421 receives the standard radio signal efficiently, and the resonant circuit made up from the antenna 421 and the condenser resonates reliably, since the antenna 421 comprises the magnetic core member 422. By the resonant circuit resonating, the controller 417 reads in the time instant information which is included in the above described standard radio signal, controls the drive section 413, and corrects the display section 414.

On the other hand, the information stored in the IC chip 416 is read by the identification means 426, as shown in FIG. 26. In this preferred embodiment of the present invention, the identification means 426 comprises a signal transmission and reception antenna 427 which operates by mutual induction with the antenna 421 which comprises the second coil 423*b*, a processing section 428 which processes the radio signals to be emitted from the signal transmission and reception antenna 427 and the radio signals received by the signal transmission and reception antenna 427, and a display section 429 which displays information which is stored in the IC chip 416. The signal transmission and reception antenna 427 is made so as to be able to transmit radio signals to the antenna 421 which includes the second coil 423*b* of the identification tag 418 which is appended to the wrist watch 411, and also to be able to receive radio signals from that antenna 421. Furthermore, the processing section 428 is connected to the signal transmission and reception antenna 427, and comprises a power source circuit 428*a* which has an internal battery, a wireless frequency (RF) circuit 428*b*, a modulation circuit 428*c*, a demodulation circuit 428*d*, a CPU 428*e*, and a memory 428*f* which is connected to this CPU 428*e* and which stores information which has been read out from the IC chip 416. Yet further, an input section 428*g* is connected to the CPU 428*e* of the processing section 428, and it is arranged for it to be possible for information which has been inputted by this input section 428*g* to be written in to the IC chip 416.

When this wrist watch 411 is approached near to the signal transmission and reception antenna 427 of the identification means 426, the identification means 426 transmits a query signal, which is a digital signal converted into binary, from the signal transmission and reception antenna 427 upon the specified radio wave frequency towards the antenna 421 of the identification tag 418 which includes the second coil 423*b*. Since the second slits 433*a* are formed in the supplementary metallic lid 433, the watch case 412 does not constitute any barrier to the radio waves which are to be received by the antenna 421 containing the second coil 423*b*, and accordingly the radio waves which have been transmitted from the signal transmission and reception antenna 427 are received by the antenna 421 which includes the second coil 423*b*. Since with this preferred embodiment of the present invention the magnetic core axis of the first coil 423*a* and the magnetic core axis of the second coil 423*b* are mutually perpendicular to one another, accordingly, even if the antenna 421 which includes the second coil 423*b* receives a radio wave signal which has been transmitted from the signal transmission and reception antenna 427 while the antenna 421 which includes the first coil 423*a* is receiving the standard radio signal and the controller 417 is controlling the drive section 413, the magnetic flux bundle which is generated by each one of these magnetic core axes does not exert any reaction upon the other coil; and in particular, since the antenna 421 which includes the second coil 423*b* comprises the magnetic core member 416*a*, accordingly the reception sensitivity of the antenna 421 itself is enhanced, and this antenna 421 efficiently receives the radio wave signals which have been emitted from the signal transmission and reception antenna 427.

When the antenna 421 of the identification tag 418 which includes the second coil 423*b* receives the radio wave signal, it charges electrical power into the condenser of the power source circuit 416*a*. The power source circuit 416*a* supplies electrical power to the CPU 416*e*, activates the IC chip 416, and, via the RF circuit 416*b*, regenerates with the demodulation circuit 416*d* the query signal of the original digital signal. Based upon this query signal, the CPU 416*e* transmits the information related to this wrist watch 411 which was stored in the memory 416*f*. The transmission of this information is performed by modulating the data signal converted to binary by the modulation circuit 416*c* of the IC chip 416, amplifying it by the RF circuit 416*b*, and transmitting it from the antenna 421 which includes the second coil 423*b*. The transmitted data is received by the signal transmission and reception antenna 427 of the identification means 426, and the processing section 428 displays upon the display section 429 the information from the identification tag 418 specific to the person who has put on the wrist watch 411.

Figure 27:
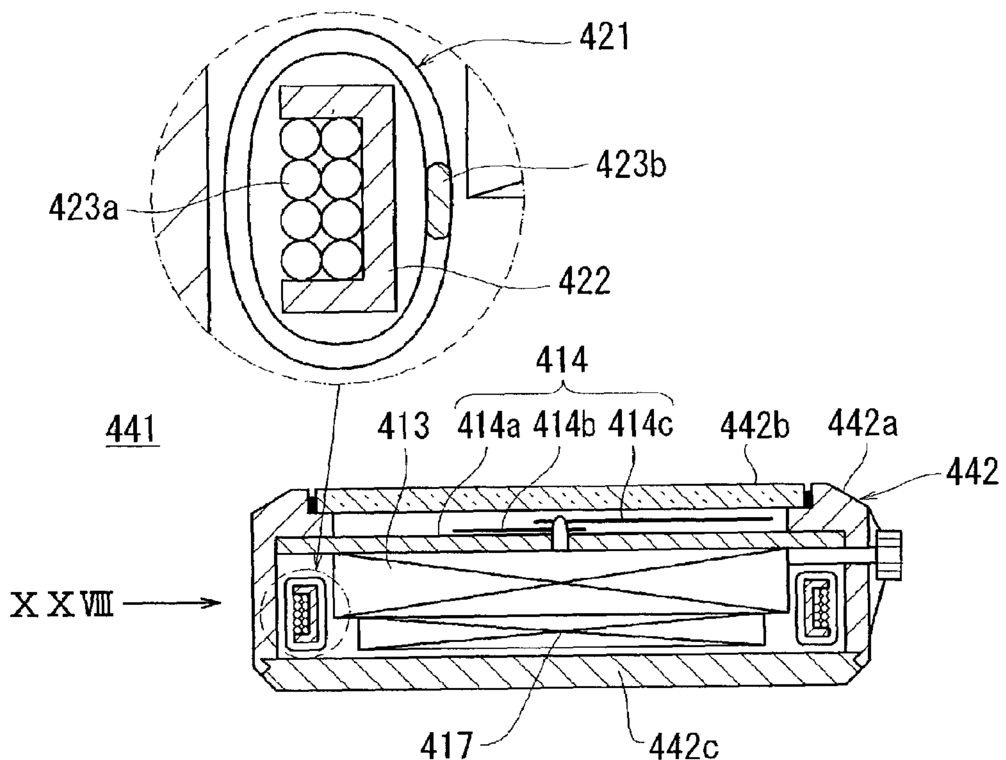
FIG. 27 is a sectional view showing a wrist watch according to another preferred embodiment of the present invention.
Figure 28:
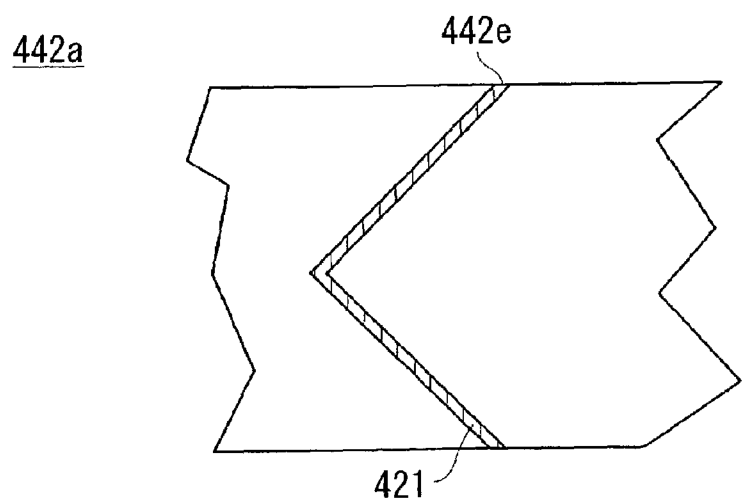
FIG. 28 is a side view of a ring shaped case thereof as seen from the direction XXVIII in FIG. 27.

FIGS. 27 through 28 show another preferred embodiment of the wrist watch 441 according to the present invention. Portions which are the same in this preferred embodiment as ones shown and described above are designated by reference numerals increased by 100, 200, or 300 in the figure, and repetitive explanation thereof will be curtailed.

As shown in FIG. 27, the wrist watch 441 according to this preferred embodiment of the present invention is a wrist watch of conventional appearance, and its watch case 442 comprises a ring shaped case 442*a* which is formed from a metallic material and a rear lid 442*c* which is formed from a non electrically conductive plastic material. As shown in FIGS. 27 and 28, a first slit 442*e* is formed in the ring shaped case 442*a*. This first slit 442*e* is formed by cutting the ring shaped case 442*a* in at least one place, and, in this preferred embodiment, the ring shaped case 442*a* is shown as having a first slit 442*e* at just one place. This first slit 442*e* is formed by cutting through the ring shaped case 442*a* by a cutting means such as a fine grindstone, a wire cutter for electro discharge machining, or a wire cutter fitted with abrasive grains, or the like, and, in this preferred embodiment, as shown in FIG. 28, the opposing faces on the two sides of this first slit 442*e* are each formed as two planes which intersect one another at a certain angle. A non electrically conductive resin 421 is filled into this first slit 442*e*, so that the opposing faces of the first slit 442*e* are mutually adhered together by this non electrically conductive resin.

The operation of the radio watch 441 constituted in this manner will now be described.

The owner of this wrist watch 441 puts it on by attaching it to his wrist via the band 419, 419. In this case, with the wrist watch according to the present invention, since the ring shaped case 442*a* which appears at the periphery of the glass lid 442*b* when the watch is on the wrist of the user is made of a metallic material, accordingly the watch 441 projects the appearance of a really high quality product. Furthermore, with the wrist watch 441 of this preferred embodiment of the present invention, although the ring shaped case 442*a* has actually been cut through, since the opposing faces of the first slit 442*e* which has been cut in the ring shaped case 442*a* are mutually adhered together by the non electrically conductive resin, accordingly there is no deterioration of the strength of the ring shaped case 442*a* caused as a result of the formation of the first slit 442*e*, and it is thus possible to secure good durability for the watch case 442.

When the predetermined time period has elapsed, the controller 417 puts the system into the ON state, and the resonant circuit constituted by the antenna 421 containing the first coil 423*a* and the condenser not shown in any figure resonates with the standard radio signal. At this time, since the first slit 442*e* is formed in the ring shaped case 442*a*, accordingly the watch case 442 does not constitute any barrier to the radio waves which are to be received by the antenna 421 which includes the first coil 423*a*, so that the standard radio signal passes through the glass lid 442*b* and the rear lid 442*c* and is received by the antenna 421. Furthermore, since the first slit 442*e* is formed in at least one place upon the ring shaped case 442*a*, accordingly induced electrical currents do not flow in the ring shaped case 442*a*, and the antenna 421 can receive the standard radio signal efficiently, with the resonant circuit made up of the antenna 421 which includes the first coil 423*a* and the condenser resonating reliably. By the resonant circuit resonating, the controller 417 reads in the time instant information which is included in the above described standard radio signal, controls the drive section 413, and regulates the display section to show the correct time.

On the other hand, when this wrist watch 441 is approached near to the signal transmission and reception antenna 427 of the identification means 426, the identification means 426 transmits a query signal, which is a digital signal converted into binary, from the signal transmission and reception antenna 427 upon the specified radio wave frequency towards the antenna 421 of the identification tag 418 which includes the second coil 423*b*. Since the first slit 442*e* is formed in the ring shaped case 442*a*, the watch case 442 does not constitute any barrier to the radio waves which are to be received by the antenna 421 containing the second coil 423*b*, and accordingly the radio waves which have been transmitted from the signal transmission and reception antenna 427 are received by the antenna 421 which includes the second coil 423*b*. When the antenna 421 for the identification tag which includes the second coil 423*b* receives these radio waves, the IC chip 416 is activated, and the CPU 416*e* transmits the information related to this wrist watch 441 which is stored in the memory 416*f* based upon this query signal. The transmission of this information is performed by it being sent from the antenna 421 which includes the second coil 423*b*, and the data which is transmitted is received by the signal transmission and reception antenna 427 of the identification means 426, upon which the processing section 428 displays upon the display section 429 the information from the identification tag 418 specific to the person who has put on the wrist watch 441.

It should be understood that, although in the above description of this wrist watch the explanation was presented in terms of the supplementary metallic lid 433 not being adhered to the rear lid 442*c*, it would be acceptable, as an alternative, for the supplementary metallic lid 433 to be adhered to the rear lid 442*c*. Even if the supplementary metallic lid 433 is adhered to the rear lid 442*c*, provided that one or two or more of the second slits 433*a* are formed in the supplementary metallic lid 433 with at least one of their end portions reaching the outer edge of said supplementary metallic lid 433, it is possible to prevent induced ring shaped electrical currents from flowing in the periphery of the supplementary metallic lid 433 when receiving the radio signals, and it is possible to avoid the phenomenon of cancellation of the radio signals by such induced electrical currents.

Figure 29:
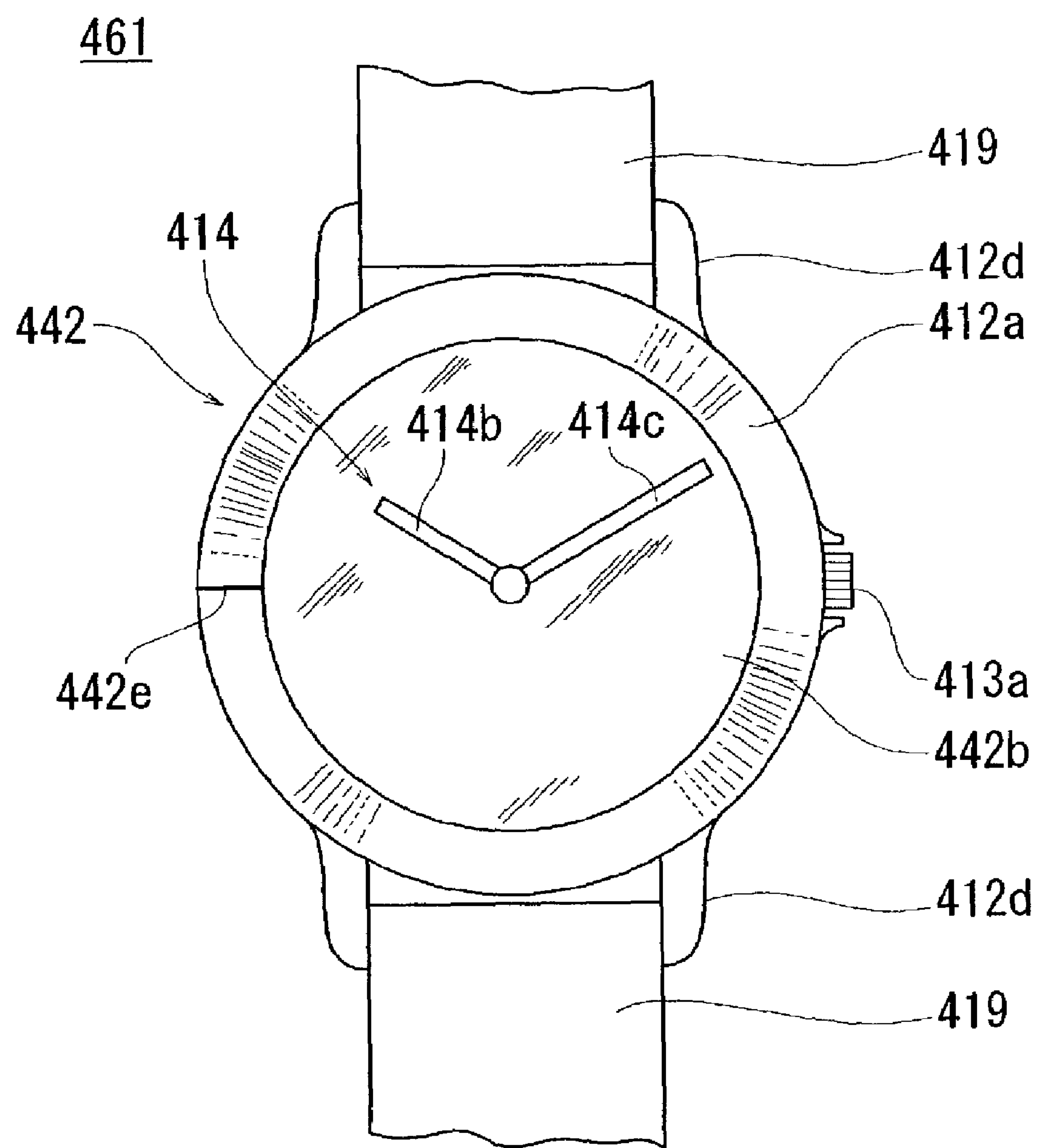
FIG. 29 is a plan view of yet another wrist watch according to the present invention.
Figure 30:
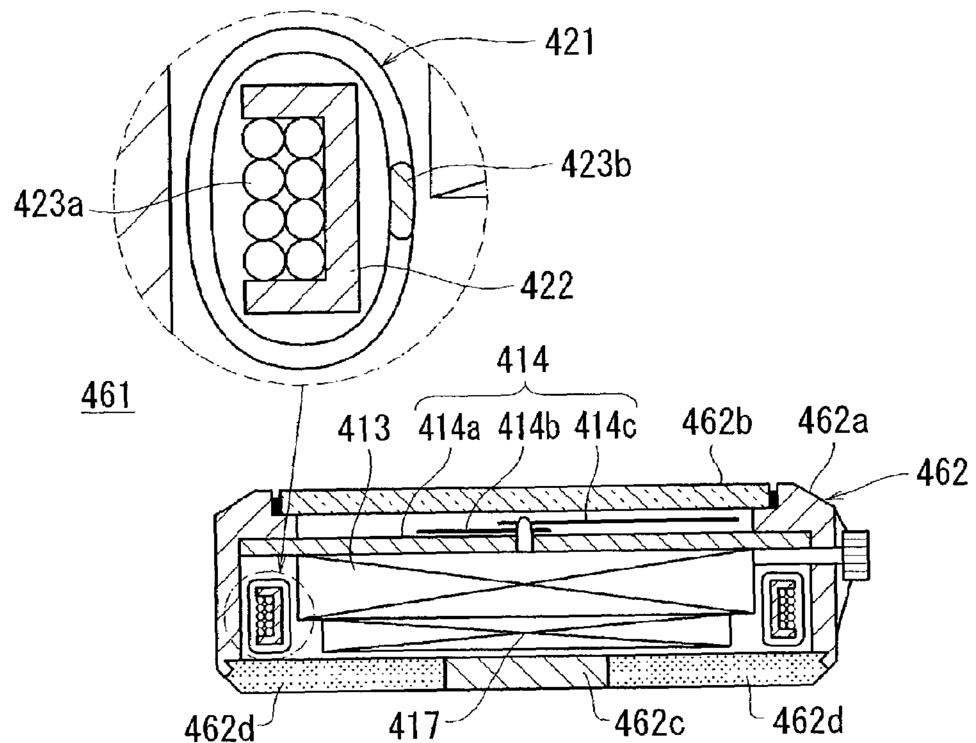
FIG. 30 is a sectional view showing yet another wrist watch according to the present invention.
Figure 31:
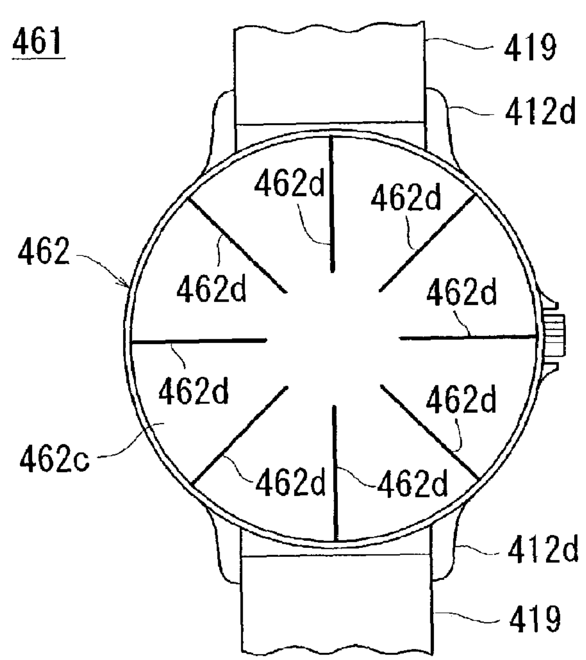
FIG. 31 is a rear view of yet another wrist watch according to the present invention.
Figure 32:
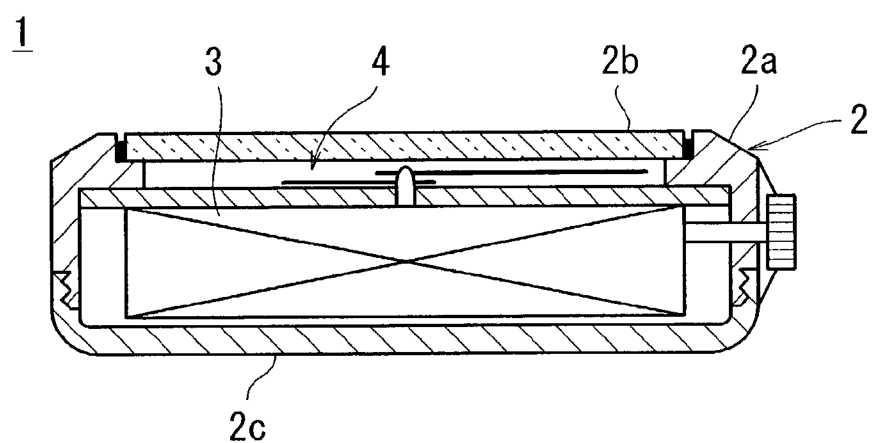
FIG. 32 is a sectional view of a conventional prior art wrist watch.
Figure 33:
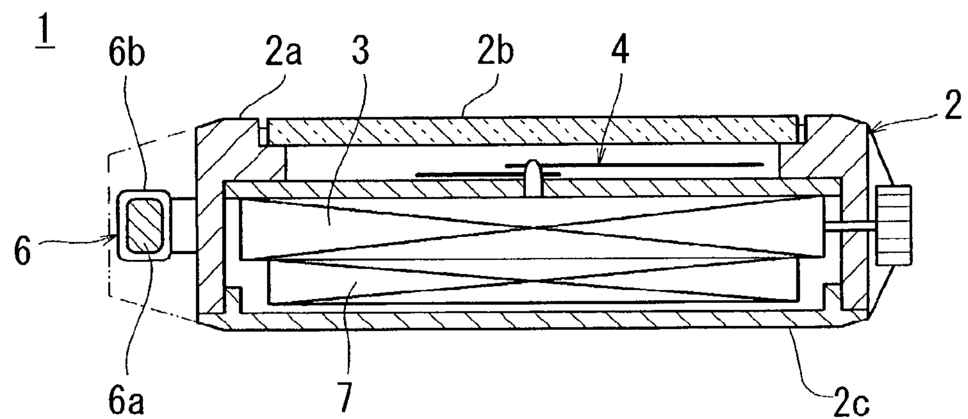
FIG. 33 is another sectional view of a conventional prior art wrist watch.
Figure 34:
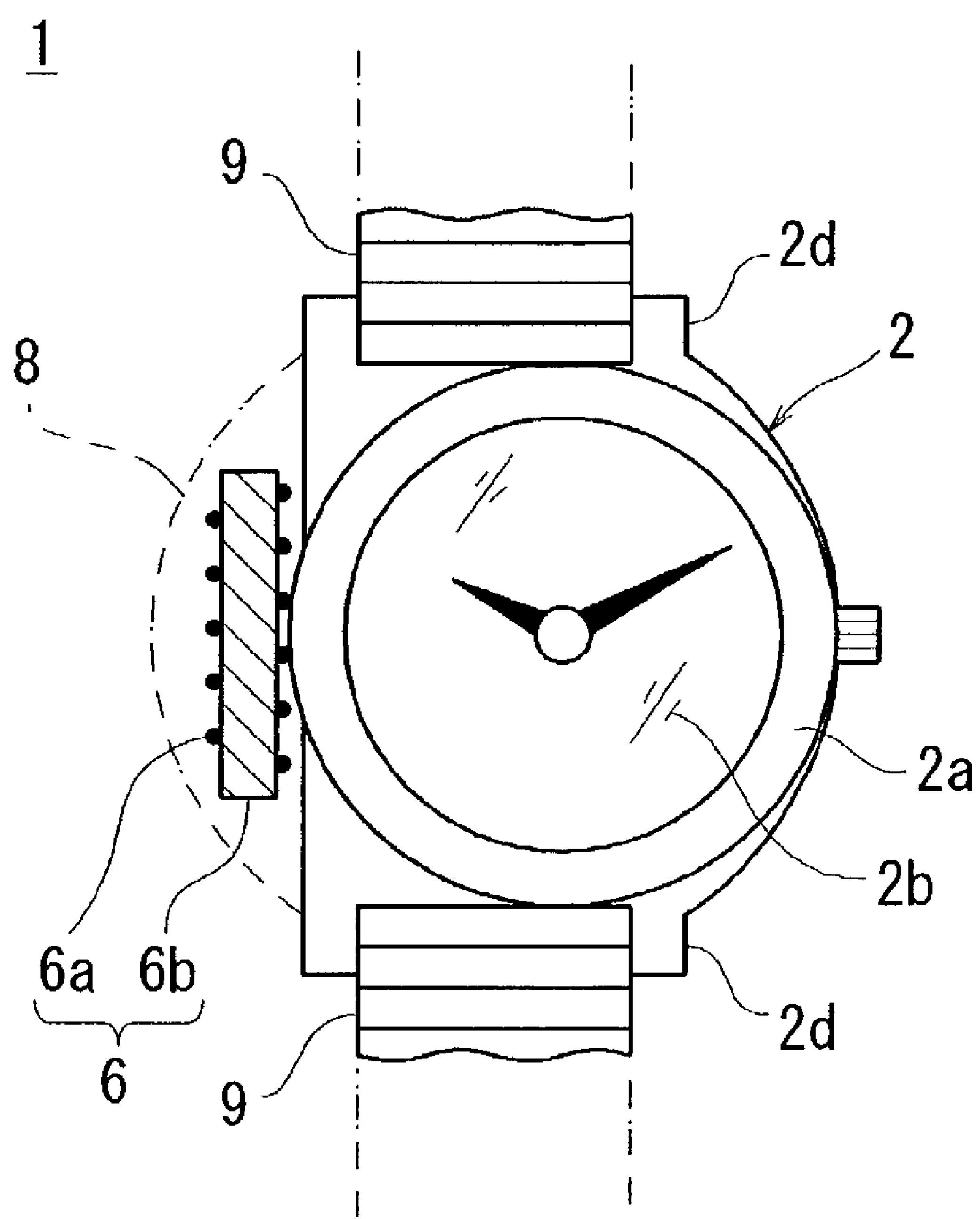
FIG. 34 is an elevation view of a prior art radio watch.

FIGS. 29 through 31 show yet another preferred embodiment of the wrist watch 461 according to the present invention. Portions which are the same in this preferred embodiment as ones shown and described above are designated by reference numerals increased by 100, 200, or 300 in the figure, and repetitive explanation thereof will be curtailed.

As shown in FIG. 29, the wrist watch 461 according to this preferred embodiment of the present invention is a comparatively high priced wrist watch 461 of a so called brand name type, and the ring shaped case 462*a* and the rear lid 462*c* of its watch case 462 are both made from a metallic material. A first slit which is not shown in the figures is formed in the ring shaped case 462*a*, and a non electrically conductive resin is filled into this first slit, so that the opposite sides of the sectional plane which defines the first slit are mutually adhered together by this non electrically conductive resin.

As shown in FIGS. 29 through 31, one or two or more second slits 462*d* are formed in the rear lid 462*c* with at least one of their end portions reaching the outer edge of said rear lid 462*c*. In this preferred embodiment of the present invention, by way of example, it is shown that eight such second slits 462*d* are formed in the rear lid 462*c*, which is made from a metallic material. These second slits 462*d* are formed by cutting through appropriate portions of the rear lid 462*c* by a cutting means such as a fine grindstone, a wire cutter for electro discharge machining, or a wire cutter fitted with abrasive grains or the like, and, in this preferred embodiment, the second slits 462*d* are formed in a radiating arrangement. A non electrically conductive resin is filled into these second slits 462*d*, and the external surface of the rear lid 462*c* offers a smoother surface, due to this non electrically conductive resin.

The operation of this radio watch 461 constituted in this manner will now be described.

The wrist watch 461 according to this preferred embodiment of the present invention is a comparatively high priced wrist watch 461, and the ring shaped case 462*a* and the rear lid 462*c* of its watch case 462 are both made from a metallic material, so that it can project a really high quality feeling. Furthermore, with the wrist watch 461 according to this preferred embodiment, although a portion of the rear lid 462*c* is cut through, since the two sides of each of the second slits 462*d* which are formed in this manner by cutting are mutually adhered together by a non electrically conductive resin 421, accordingly there is no deterioration of the strength of the rear lid 462*c* caused by the formation of these second slits 462*d*, and it is possible to ensure a high durability for the watch case 462.

When the predetermined time period has elapsed, the controller 417 puts the system into the ON state, and the resonant circuit constituted by the antenna 421 containing the first coil 423*a* and the condenser not shown in any figure resonates with the standard radio signal. At this time, since the first slit 462*e* is formed in the ring shaped case 462*a*, and also the second slits 462*d* are formed in the rear lid 462*c*, accordingly the watch case 462 does not constitute any barrier to the radio waves which are to be received by the antenna 421 which includes the first coil 423*a*, so that the standard radio signal passes through the ring shaped case 462*a* and the rear lid 462*c* and is received by the antenna 421. Furthermore, due to the presence of the first slit not shown in the figures and the second slits 462*d*, accordingly induced electrical currents do not flow in the ring shaped case 462*a* or the periphery of the rear lid 462*c*, so that the antenna 421 can receive the standard radio signal efficiently, with the resonant circuit made up of the antenna 421 which includes the first coil 423*a* and the condenser resonating reliably. By the resonant circuit resonating, the controller 417 reads in the time instant information which is included in the above described standard radio signal, controls the drive section 413, and regulates the display section to show the correct time.

On the other hand, when this wrist watch 461 is approached near to the signal transmission and reception antenna 427 of the identification means 426, the identification means 426 transmits a query signal, which is a digital signal converted into binary, from the signal transmission and reception antenna 427 upon the specified radio wave frequency towards the antenna 421 of the identification tag 418 which includes the second coil 423*b*. When the antenna 421 for the identification tag 418 which includes the second coil 423*b* receives these radio waves, the IC chip 416 is activated, and the CPU 416*e* transmits the information related to this wrist watch 461 which is stored in the memory 416*f* based upon this query signal. The transmission of this information is performed by it being sent from the antenna 421 which includes the second coil 423*b*, and the data which is transmitted is received by the signal transmission and reception antenna 427 of the identification means 426, upon which the processing section 428 displays upon the display section 429 the information from the identification tag 418 specific to the person who has put on the wrist watch 461.

It should be understood that, although in the above description of this wrist watch, with regard to the formation of the first slit 462*e* in the ring shaped case 462*a*, the explanation was presented in terms of said first slit 462*e* consisting of two connected sectional planes, it would be acceptable, as an alternative, for the first slit 462*e* to be formed as a simple plane, with its two sides mutually opposing one another, or alternatively for it to be formed as three or more sectional planes which opposed one another. Furthermore, it would also be acceptable for the number of the mutually opposing sectional planes of the first slit 462*e* to be 4, 5, 6, or a larger number, all being connected together.

Furthermore, in the above described preferred embodiment of the present invention, although the description has been presented in terms of the first slit being formed in a single place upon the ring shaped case 462*a*, it would also be acceptable, as an alternative, for the first slit to be formed in two or more places. However, if the first slit 462*e* is formed in two or more places in this manner, then the ring shaped case 462*a* itself comes to be made of a plurality of members, and, since it is therefore necessary to enhance the mechanical strength of this ring shaped case 462*a*, accordingly, since each of the first slits 462*e* is made up from a plurality of linked sectional planes of which the opposite faces mutually confront one another, it is desirable strongly to adhere the plurality of members mutually together by the non electrically conductive resin 421 which is filled into these first slits 462*e*.

It should be understood that, although in the above description of this preferred embodiment of the present invention the explanation was made in terms of using the supplementary lid 433 in which the two mutually perpendicular second slits 433*a* were formed which divided said supplementary lid 433 into four quarters, and the eight second slits 462*d* were used which were disposed in an isomeric radiating arrangement from the center of the rear lid 462*c*, it would also be acceptable, as an alternative, although this is not shown in any figure, for the second slits 433*a* to be unified into one long transverse slit that divided the rear lid or the supplementary metallic lid 433 into two pieces; or for the second slits not to be arranged in a radiating pattern, provided that they stopped the flow of ring shaped induced electrical currents; and, if the second slits 433*a* are in fact arranged in a radiating pattern, the number of them which are provided may be, not 8, but 2, 3, 4, 5, 6, 7, 9, 10, or a greater number.

EXAMPLES

Next, certain preferred Examples of the present invention will be described in detail along with certain Comparative Examples. Numerals in the following parentheses indicate the corresponding elements in the figures.

Comparative Example 1

A watch case (112) which comprised a ring shaped case (112*a*) of 3 mm in thickness having an internal diameter of 28 mm and made from stainless steel, a glass lid (112*b*) which sealed the face side of this ring shaped case (112*a*), and a rear lid (112*c*) which was made from polycarbonate resin and which sealed the rear side of this ring shaped case (112*a*), was prepared, and a circular plate shaped drive section (113) of external diameter 20 mm was housed within this watch case (112). On the other hand, an antenna was manufactured which consisted of a coil of only five turns of coated copper wire of 0.08 mm in thickness, wound so as to surround the drive section (113) and so as to follow the inner surface of the ring shaped case (112*a*). A wrist watch with internal tag was obtained by housing this antenna in the watch case. This wrist watch constituted Comparative Example 1.

Example 1

A watch case (112) the same as in the case of Comparative Example 1 was prepared, and a drive section (113) of the same shape and size as in the case of Comparative Example 1 was housed in this watch case (112).

On the other hand, a composite material which consisted of a mixture of 56% by volume of soft magnetic metallic powder and 44% by volume of plastic was formed by injection molding into a ring shaped member of 21 mm internal diameter and 27 mm external diameter, and this member was cut into four quarters, and thereby a magnetic core member (116*a*) made from this composite material was obtained, having the shape of a torus whose cross sectional shape was circular and 6 mm in diameter. And forty turns of coated copper wire of 0.08 mm in thickness were wound in a helical shape upon this magnetic core member (116*a*), so as to form a coil (116*b*), and this magnetic core member (116*a*) and coil (116*b*) constituted an antenna (116). This antenna was housed in the watch case (112) so as to follow along the inner surface of the rear lid (112*c*) between the ring shaped case (112*a*) and the drive section (113), and thereby a wrist watch (111) with internal tag was obtained. This wrist watch constituted Example 1.

Comparison Experiment 1

The test terminals of a testing device for measurement of coil characteristics (Type 4395 made by the Hewlett Packard Company) were connected to each of the coils of the antennas of the above described Comparative Example 1 and Example 1, and the L values and the Q values at a frequency of 13.56 MHz for each of these antennas were measured by this testing device.

Furthermore, an IC chip was connected to each of the coils of the antennas of the above described Comparative Example 1 and Example 1, and after they were made to function as RFID tags at 13.56 MHz, these tags were housed in battery cases. Each of these wrist watches with internal tag was approached towards a signal transmission and reception antenna of an identification means which operated at 13.56 MHz, and it was checked whether or not this identification means operated, and, if it operated, the distance between the signal transmission and reception antenna and the wrist watch with internal tag when it first operated was measured. The results of these trials are shown in Table 1.

TABLE 1

| | Example 1 | Comparative Example 1 |
|---|---|---|
| Magnetic Core Member | Present | Not Present |
| L ($\mu$H) | 1.308 | 1.155 |
| Q | 28.5 | 92.3 |
| Operated? | Operated at a Distance of 10 mm | Did Not Operate |

As will be clear from Table 1, it cannot be said that there was an outstanding difference in the L values between Example 1 and Comparative Example 1. Furthermore, irrespective of the fact that the Q value in Comparative Example 1 was clearly bigger as compared with the Q value in Example 1, when the IC chip was connected to the coil of the antenna in Comparative Example 1, the identification means thereby constituted did not work. On the other hand, although the Q value in Example 1 was smaller as compared with the Q value in Comparative Example 1, when the IC chip was connected to the coil of the antenna in Concrete Example 1, the identification means thereby constituted did indeed work. The fact that the identification means of Comparative Example 1 did not work, is thought to be due to the fact that, when the antenna was receiving radio waves, these radio waves were cancelled by induced electrical currents which flowed in the case member. On the other hand, the fact that the identification means of Example 1 did work, is thought to be due to the fact that the axis of magnetization of the antenna 16 was parallel to the rear lid 12*c*, such cancellation of the radio waves due to flow of induced electrical currents was suppressed.

Comparative Example 2

A watch case (212) which comprised a ring shaped case (212*a*) of 3 mm in thickness having an internal diameter of 28 mm and made from stainless steel, a glass lid (212*b*) which sealed the face side of this ring shaped case (212*a*), and a rear lid (212*c*) which was made from polycarbonate resin and which sealed the rear side of this ring shaped case (212*a*), was prepared, and a circular plate shaped drive section (213) of external diameter 20 mm was housed within this watch case (212). On the other hand, an antenna was manufactured which consisted of a coil of only five turns of coated copper wire of 0.08 mm in thickness, wound so as to surround the drive section (213) and so as to follow the inner surface of the ring shaped case (212*a*). A wrist watch with internal tag was obtained by housing this antenna in the watch case. This wrist watch constituted Comparative Example 2.

Example 2

A watch case (212) the same as in the case of Comparative Example 2 was prepared, and a drive section (213) of the same shape and size as in the case of Comparative Example 2 was housed in this watch case (212).

On the other hand, a composite material which consisted of a mixture of 56% by volume of soft magnetic metallic powder and 44% by volume of plastic was formed by injection molding into a magnetic backing (216*a*) and a pair of magnetic core members (216*b*) integral therewith. The magnetic backing (216*a*) was formed in a ring shape of 21 mm internal diameter and 27 mm external diameter, and the pair of magnetic core members (216*b*) were provided to stand up from the magnetic backing (216*a*) on opposite sides of the drive section (213). And twenty turns of coated copper wire of 0.08 mm in thickness were wound in a helical shape upon each of these pair of magnetic core members (216*b*) (so that in all forty turns of wire were wound upon the magnetic core members (216*b*) as a whole), so as to form a coil (216*c*), and thereby an antenna (216) was constituted. The magnetic backing (216*a*) of this antenna (216) was housed in the watch case (212) so as to follow along the inner surface of the rear lid (212*c*), and thereby a wrist watch (211) with internal tag was obtained. This wrist watch constituted Example 2.

Comparison Experiment 2

The test terminals of a testing device for measurement of coil characteristics (Type 4395 made by the Hewlett Packard Company) were connected to each of the coils of the antennas of the above described Comparative Example 2 and Example 2, and the L values and the Q values at a frequency of 13.56 MHz for each of these antennas were measured by this testing device.

Furthermore, an IC chip was connected to each of the coils of the antennas of the above described Comparative Example 2 and Example 2, and after they were made to function as RFID tags at 13.56 MHz, these tags were housed in battery cases. Each of these wrist watches with internal tag was approached towards a signal transmission and reception antenna of an identification means which operated at 13.56 MHz, and it was checked whether or not this identification means operated, and, if it operated, the distance between the signal transmission and reception antenna and the wrist watch with internal tag when it first operated was measured. The results of these trials are shown in Table 2.

TABLE 2

| | Example 2 | Comparative Example 2 |
|---|---|---|
| Magnetic Core Member | Present | Not Present |
| L ($\mu$H) | 1.205 | 1.155 |
| Q | 31.6 | 92.3 |
| Operated? | Operated at a Distance of 12 mm | Did Not Operate |

As will be clear from Table 2, it cannot be said that there was an outstanding difference in the L values between Example 2 and Comparative Example 2. Furthermore, irrespective of the fact that the Q value in Comparative Example 2 was clearly bigger as compared with the Q value in Example 2, when the IC chip was connected to the coil of the antenna in Comparative Example 2, the identification means thereby constituted did not work. On the other hand, although the Q value in Example 2 was smaller as compared with the Q value in Comparative Example 2, when the IC chip was connected to the coil of the antenna in Concrete Example 2, the identification means thereby constituted did indeed work. The fact that the identification means of Comparative Example 2 did not work, is thought to be due to the fact that, when the antenna was receiving radio waves, these radio waves were cancelled by induced electrical currents which flowed in the case member. On the other hand, the fact that the identification means of Example 2 did work, is thought to be due to the fact that, because the continuous coil 16*c* was wound upon the pair of magnetic core members 16*b*, 16*b* which stood up from the magnetic backing 16*a*, accordingly such cancellation of the radio waves due to flow of induced electrical currents was suppressed.

Comparative Example 3

A watch case (312) which comprised a ring shaped case (312*a*) of 5 mm in thickness having an external diameter of 32 mm and an internal diameter of 25 mm and made from stainless steel, and a rear lid (312*c*) of diameter 30 mm and thickness 1 mm which was made from polycarbonate and which sealed the rear side of this ring shaped case (312*a*), was prepared.

On the other hand, a magnetic core member (316*a*) of a toroidal shape and of dimensions 25 mm×15 mm×4 mm (external diameter×internal diameter×thickness respectively) was formed by injection molding a composite material made from 8% by weight of plastic and 92% by weight of carbonyl iron powder, and 400 turns of coated wire of diameter 0.1 m was wound upon this magnetic core member (316*a*), so as to form a coil (316*b*). A radio watch was obtained by housing the antenna (316) consisting of this magnetic core member (316*a*) and this coil (316*b*) in the above described watch case. This radio watch constituted Comparative Example 3.

Example 3

A watch case (312) the same as the one in Comparative Example 3, and an antenna (316) the same as in Comparative Example 3, were prepared. And a portion of the ring shaped case (312*a*) of this watch case (312) was cut at a width of 0.07 mm, so as to form a first slit in this ring shaped case (312*a*). Thereafter, a wrist watch with internal tag was obtained by housing the antenna (316) in the above described watch case. This radio watch incorporating the ring shaped case (312*a*) which had this slit, constituted Example 3.

Comparison Experiment 3

The test terminals of a testing device for measurement of coil characteristics (Type 4395 made by the Hewlett Packard Company) were connected to each of the coils of the antennas of the above described Comparative Example 3 and Example 3, and the L values and the Q values at a frequency of 13.56 MHz for each of these antennas were measured by this testing device.

Furthermore, in both Comparative Example 3 and Example 3, it was investigated whether or not the antenna resonated with the standard radio signal, the controller read in the time instant information thereof, and the display section corrected the time instant; in other words, whether the time instant correction function of the radio watch worked or not. The results are shown in Table 3.

TABLE 3

| | Example 3 | Comparative Example 3 |
|---|---|---|
| L ($\mu$H) | 8.261 | 7.653 |
| Q | 78.4 | 18.5 |
| Operated? | Operated Properly | Did Not Operate |

As will be clear from Table 3, it cannot be said that there was an outstanding difference in the Q values between Example 3 and Comparative Example 3. However, although with the radio watch of Example 3 the time instant correction function worked, nevertheless, with the radio watch of Comparative Example 3, the time instant correction function did not work. The fact that the radio watch of Comparative Example 3 did not work, is thought to be because, since no slit was formed in the ring shaped case of Comparative Example 3, accordingly induced electrical currents flowed in the case member, which was a cause of deterioration in the sensitivity of the antenna. On the other hand, the fact that the radio watch of Example 3 did work, is thought to be due to the fact that, because the slit was formed in its ring shaped member, accordingly no induced electrical currents flowed in its case member, so that as a result it was possible to suppress deterioration in the sensitivity of the antenna.

What is claimed is:

1. A wrist watch with internal tag, comprising:

a watch case comprising a ring shaped case, a glass lid configured to seal a front side of said ring shaped case, and a rear lid configured to seal a rear side of said ring shaped case;

a drive section housed in said watch case;

a display section housed in said watch case, the display section being configured to be driven by said drive section and to display a time instant; and an RFID tag housed in said watch case and comprises an antenna and an IC chip;

wherein said antenna comprises a rod shaped magnetic core member provided between said ring shaped case and said drive section and along the inner surface of said rear lid, and a coil is wound in a helical shape around said magnetic core member.

2. A wrist watch with internal tag according to claim 1, wherein said magnetic core member is shaped so as to bend around along the inner surface of said ring shaped case.

3. A wrist watch with internal tag according to claim 1, wherein said magnetic core member is made from a layered amorphous foil material so as to have a certain flexibility.

4. A wrist watch with internal tag according to claim 1, wherein said magnetic core member is made from a composite material which is a mixture of powder or flakes of a soft magnetic ferrite or a soft magnetic metal with plastic or rubber.

5. A wrist watch with internal tag according to claim 4, wherein said composite material contains a volume percentage of from 10% to 70% of said powder or said flakes of said soft magnetic ferrite or said soft magnetic metal, and is flexible.

6. A wrist watch with internal tag according to claim 4, wherein said magnetic core member is formed by injection molding or compression forming said composite material.

7. A wrist watch with internal tag, comprising:

a watch case comprising a ring shaped case, a glass lid configured to seal a front side of said ring shaped case, and a rear lid configured to seal a rear side of said ring shaped case;

a drive section housed in said watch case;

a display section housed in said watch case, the display section being configured to be driven by said drive section and to display a time instant; and an RFID tag which is housed in said watch case and comprises an antenna and an IC chip;

wherein said antenna comprises a magnetic backing provided to follow around an inner surface of said rear lid, a pair of magnetic core members configured to project from said magnetic backing on opposite sides of said drive section, and a series coil which is wound in a helical shape upon said pair of magnetic core members.

8. A wrist watch according to claim 7, wherein said magnetic backing is configured to be inserted between said ring shaped case and said drive section.

9. A wrist watch according to claim 7, wherein said magnetic backing is between said ring shaped case and said drive section and is formed in a circular arc shape following along an inner surface of said ring shaped case.

10. A wrist watch according to claim 7, wherein any one, each, or all of said magnetic backing and said pair of magnetic core members is made from a composite material which is a mixture of powder or flakes of a soft magnetic ferrite or a soft magnetic metal with plastic or rubber.

11. A wrist watch according to claim 10, wherein said composite material contains a volume percentage of from 10% to 70% of said powder or said flakes of said soft magnetic ferrite or said soft magnetic metal, and is flexible.

12. A wrist watch according to claim 10, wherein all of said magnetic backing and said pair of magnetic core members are formed integrally by injection molding or compression forming said composite material.

13. A radio watch, comprising:

a watch case comprising a ring shaped case, a glass lid configured to seal a front side of said ring shaped case, and a rear lid configured to seal a rear side of said ring shaped case;

a drive section housed in said watch case;

a display section housed in said watch case, the display section being configured to be driven by said drive section and to display a time instant;

an antenna configured to receive a radio signal including time instant information; and a controller housed in said watch case and configured to control said drive section based upon the detected an output from said antenna;

wherein said antenna is configured to be between said ring shaped case and said drive section and to follow around an inner surface of said ring shaped case; and said ring shaped case is formed from a metallic material, and said ring shaped case comprises a first slit configured to cut completely through said ring shaped case in at least one place.

14. A radio watch according to claim 13, wherein a non electrically conductive resin is filled into said first slit, and is configured to mutually adhere together opposing sides of said first slit.

15. A radio watch according to claim 14, wherein said opposing sides of said first slit are made up of a plurality of linked sectional planes.

16. A radio watch according to claim 13, wherein concave portions are formed on either or both of said front side and said rear side of said ring shaped case, said first slit is formed in a position to confront said concave portions, and inlay members made from the same substance as said ring shaped case are attached with non electrically conductive resin in said concave portions.

17. A radio watch according to claim 13, wherein said rear lid is either a metallic main lid, or a combination of a non metallic main lid and a supplementary metallic lid adhered upon an outer surface of said non metallic main lid so as to cover said non metallic main lid; and in said metallic main lid or said supplementary metallic lid, one or plural second slits are formed, of which at least one end portion reaches the outer edge of said metallic main lid or said supplementary metallic lid.

18. A radio watch according to claim 17, wherein plural second slits are formed in a radiating arrangement from the center of said metallic main lid or said supplementary metallic lid.

19. A radio watch according to claim 17, wherein a non electrically conductive resin is filled into said second slit or slits.

20. A radio watch according to claim 13, wherein said antenna comprises a magnetic core member configured to follow the inner surface of said ring shaped case and surround said drive section, and a coil which is wound around the outside of said magnetic core member.

21. A radio watch according to claim 20, wherein said magnetic core member is formed in a bobbin shape having a coil winding case, from a composite material made from magnetic powder or flakes and plastic.

22. A radio watch according to claim 21, wherein said magnetic core member is formed by injection molding or compression forming said composite material.

23. A radio watch according to claim 20, wherein said magnetic core member is made by winding a magnetic coated film which is formed by applying and drying an ink or a paint containing powder or flakes made from a magnetic material into a ring shape.

24. An antenna for a wrist watch which comprises a watch case comprising a ring shaped case, a glass lid which seals a front side of said ring shaped case, and a rear lid which seals a rear side of said ring shaped case, and a drive section which is housed in said watch case, wherein:

said antenna is housed within said watch case, and comprises a magnetic core member and a coil assembly;

said magnetic core member has a hole in which said drive section can be inserted, and is formed in a ring shape which can be inserted between said drive section and said ring shaped case; and said coil assembly comprises a first coil which is wound around the outer peripheral surface of said ring shaped magnetic core member so as to have a magnetic core axis which coincides with the central axis of said ring shaped magnetic core member, and a second coil which is wound in a helical shape upon said ring shaped magnetic core member so as to have said ring shaped magnetic core member as its magnetic core axis.

25. An antenna for a wrist watch according to claim 24, wherein said magnetic core member is formed by injection molding or compression forming a composite material which is a mixture of magnetic powder or flakes with plastic.

26. An antenna for a wrist watch according to claim 24, wherein said magnetic core member is made by winding a magnetic coated film which is formed by applying and drying an ink or a paint containing powder or flakes made from a magnetic material into a ring shape.

27. A wrist watch comprising:

a watch case comprising a ring shaped case and a rear lid both of which are formed from a non electrically conductive plastic material;

a display section which is housed in said watch case and displays a time instant;

a drive section which is housed in said watch case and is made so as to be able to drive said display section;

an antenna according to any one of claims 24 through 26, housed in said watch case so as to follow around the inner surface of said ring shaped case of said watch case and surround said drive section;

a controller which is housed in said case, is electrically connected to said first coil, and is made so as to be able to control said drive section based upon a detected output of said antenna; and an IC chip which is housed in said case, is electrically connected to said second coil, and is made so as to be able to store predetermined information.

28. A wrist watch according to claim 27, wherein a supplementary metallic lid, in which one or two or more second slits are formed with at least one end portion thereof reaching to the outer edge of said supplementary metallic lid, is adhered upon the outer surface of said rear lid which is formed from said non electrically conductive plastic.

29. A wrist watch comprising:

a watch case comprising a ring shaped case which is formed from a metallic material and a rear lid which is formed from a non electrically conductive plastic material;

a display section which is housed in said watch case and displays a time instant;

a drive section which is housed in said watch case and is made so as to be able to drive said display section;

an antenna according to any one of claims 24 through 26, housed in said watch case so as to follow around the inner surface of said ring shaped case of said watch case and surround said drive section;

a controller which is housed in said case, is electrically connected to said first coil, and is made so as to be able to control said drive section based upon a detected output of said antenna; and an IC chip which is housed in said case, is electrically connected to said second coil, and is made so as to be able to store predetermined information;

wherein a first slit is formed in said ring shaped case by cutting through said ring shaped case in at least one place.

30. A wrist watch according to claim 29, wherein a supplementary metallic lid, in which one or two or more second slits are formed with at least one end portion thereof reaching to the outer edge of said supplementary metallic lid, is adhered upon the outer surface of said rear lid which is formed from said non electrically conductive plastic.

31. A wrist watch comprising:

a watch case comprising a ring shaped case and a rear lid both of which are formed from a metallic material;

a display section which is housed in said watch case and displays a time instant;

a drive section which is housed in said watch case and is made so as to be able to drive said display section;

an antenna according to any one of claims 24 through 26, housed in said watch case so as to follow around the inner surface of said ring shaped case of said watch case and surround said drive section;

a controller which is housed in said case, is electrically connected to said first coil, and is made so as to be able to control said drive section based upon a detected output of said antenna; and an IC chip which is housed in said case, is electrically connected to said second coil, and is made so as to be able to store predetermined information;

wherein a first slit is formed in said ring shaped case by cutting through said ring shaped case in at least one place; and one or two or more second slits are formed in said rear lid with at least one end portion thereof reaching to the outer edge of said rear lid.

* * * * *